(12) United States Patent
Schwartz et al.

(10) Patent No.: US 6,529,478 B1
(45) Date of Patent: *Mar. 4, 2003

(54) PASS/DROP APPARATUS AND METHOD FOR NETWORK SWITCHING NODE

(75) Inventors: Steven J. Schwartz, Sudbury, MA (US); James D. Carlson, North Andover, MA (US)

(73) Assignee: Fluris, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/198,935

(22) Filed: Nov. 24, 1998

Related U.S. Application Data

(63) Continuation of application No. 09/108,771, filed on Jul. 2, 1998, now Pat. No. 6,434,115.

(51) Int. Cl.[7] .............................................. H04L 12/56
(52) U.S. Cl. ....................................... 370/236; 370/414
(58) Field of Search ................................ 370/230, 235, 370/236–413, 414, 416, 418, 412, 417, 395.71, 395.4

(56) References Cited

U.S. PATENT DOCUMENTS

| | | | |
|---|---|---|---|
| 5,130,984 A | 7/1992 | Cisneros | 370/94.1 |
| 5,357,506 A | 10/1994 | Sugawara | 370/60 |

(List continued on next page.)

FOREIGN PATENT DOCUMENTS

| | | | |
|---|---|---|---|
| EP | 0603916 A2 | 6/1994 | H04L/12/56 |

OTHER PUBLICATIONS

Pei, Tong–Bi "VLSI Implementation of Routing Tables: Tries and Cams," Proceedings of the Annual Joint Conference of the Computer and Communication Societies, IEEE vol. 10, 1991, pp. 515–524.

*Primary Examiner*—Chau Nguyen
*Assistant Examiner*—Jasper Kwoh
(74) *Attorney, Agent, or Firm*—Donald R. Boys; Central Coast Patent Agency, Inc.

(57) ABSTRACT

A switching node for transferring packets, each including a destination address, in a network includes a plurality of input port modules, a plurality of output port modules and a switching fabric, including a packet meta-data processor and a packet switch. Each input port module is connected to a communication link for receiving packets thereover, and each output port module is connected to a communication link for transmitting packets thereover. Each input port module, upon receiving a packet, buffers the packet and generates a meta-data packet therefor identifying the output port module that is to transmit the packet and packet identifier information, and provides it to the packet meta-data processor. The packet meta-data processor receives the meta-data packets generated by all of the input port modules and operational status information from all of the output port modules and for each output port module, processes the meta-data packets received from all of the input port modules in connection with the operational status information to determine whether the packet should be passed or dropped. If the packet meta-data processor determines that a packet associated with a meta-data packet is to be dropped, it will notify the input port module in which the packet is buffered, which, in turn, will discard the packet. On the other hand if the packet meta-data processor determines that the packet associated with the meta-data packet is not to be dropped, it will enqueue the meta-data packet for the associated output port module. Each output port module retrieves meta-data packets from its respective meta-data packet queue maintained therefor by the packet meta-data processor. For each meta-data packet retrieved by an output port module, the output port module will request that the input port module identified in the meta-data packet transfer the packet identified in the input port module thereto through the packet switch. When the output port module receives the packet, it will transmit it over the communication link connected thereto.

14 Claims, 8 Drawing Sheets

U.S. PATENT DOCUMENTS

| | | | |
|---|---|---|---|
| 5,481,687 A | | 1/1996 | Goubert et al. ........ 395/421.02 |
| 5,546,390 A | | 8/1996 | Stone ........................... 370/60 |
| 5,570,348 A | * | 10/1996 | Holden ....................... 370/236 |
| 5,726,977 A | * | 3/1998 | Lee ............................. 370/235 |
| 5,748,629 A | | 5/1998 | Caldara et al. ............. 370/389 |
| 5,768,257 A | | 6/1998 | Khacherian et al. ........ 370/229 |
| 5,838,677 A | * | 11/1998 | Kozaki et al. .............. 370/389 |
| 5,870,396 A | | 2/1999 | Abu-Amara et al. ........ 370/413 |
| 5,956,342 A | * | 9/1999 | Manning et al. ............. 370/414 |
| 5,978,359 A | * | 11/1999 | Caldara et al. ............. 370/236 |
| 6,067,298 A | * | 5/2000 | Shinohara ................... 370/395 |
| 6,122,252 A | * | 9/2000 | Aimoto et al. .............. 370/235 |
| 6,434,115 B1 | * | 8/2002 | Schwartz et al. ........... 370/235 |
| 6,442,172 B1 | * | 8/2002 | Wallner et al. .............. 370/416 |

* cited by examiner

PASS/DROP APPARATUS AND METHOD FOR NETWORK SWITCHING NODE

RELATED APPLICATIONS

This application is a continuation of U.S. application Ser. No. 09/108,771 filed on Jul. 2, 1998 now U.S. Pat. No. 6,434,115.

FIELD OF THE INVENTION

The invention relates generally to the field of digital communications, and more particularly to systems and method for switching packets of digital data in a switching node used in a digital data network.

BACKGROUND OF THE INVENTION

Digital networks have been developed to facilitate the transfer of information, including data and programs, among digital computer systems and numerous other types of devices. A variety of types of networks have been developed and implemented using diverse information transfer methodologies. In modem networks, information is transferred through a mesh of switching nodes which are interconnected by communication links in a variety of patterns. The mesh interconnected pattern can allow for a number of paths to be available through the network from each computer system or other device which may transmit information as a source device, to another computer system or other device, which is to receive the information as a destination device, so that if congestion develops in particular regions of the network, or if components of the network become inoperative, information can be routed around the congested or inoperative portion of the network.

Information transferred from a source device to a destination device is generally transferred in the form of fixed-or variable-length packets, which are received by a switching node over one communication link connected thereto, and transmitted over another communication link to facilitate transfer of the packet to the destination device or another switching node along a path to the destination device. Each packet typically includes address information, including a source address that identifies the particular device that generated the packet, and a destination address that identifies the particular device or devices to receive the packet.

Typically, a switching node includes one or more input ports, each of which is connected to a communication link to receive packets, a plurality of output ports, each of which is connected to a communication link to transmit packets, and a "switching fabric" that couples packets from the input ports to the respective outport ports for transmission. After an input port receives a packet, it will typically buffer the packet, identify from the destination address the particular output port that is to transmit the packet and transfer the packet to the output port through the switching fabric. After the output port receives the packet, it (that is, the output port) will typically buffer the packet in a queue for transmission over the communication link connected thereto. While buffering and scheduling by the output port can provide for efficient packet transmission by the output port, since the output port can be kept continually busy, several problems can arise with output port buffering. Generally, each output port will effectively provide one queue for each input port, in which case the total number of queues provided by the switching node will be on the order of $N^2$, where "N" is the number of input ports, which, in turn, corresponds to the number of output ports, if, as is typical, each communication link provides for bidirectional transmission of packets. Thus, as "N," the number of input/ouput ports, increases, the number of queues maintained by the output ports increases quadratically, at a much faster rate, and so output queuing does not scale well.

Instead of using output queuing of packets to be transmitted, switching nodes have been developed which can provide input queuing, in which packets are buffered and queued at the input ports. Only one queue is needed for each input port, and so, as the number of input (and output) ports increases, the number of queues increases at a linear rate, avoiding the quadratic increase with output queuing. However, input queuing results in much lower efficiency of usage of the switching fabric, since the input ports must, after buffering received packets, essentially contend and arbitrate for use of the switching fabric to facilitate transfer of the packets to the respective output ports for transmission.

SUMMARY OF THE INVENTION

The invention provides a new and improved switching node which provides for the efficient use of the switching fabric interconnecting input and output ports that is characteristic of a switching node that provides for output-queuing of packets transferred by the switching node, while avoiding the quadratic increase in packet queues, relative to increasing numbers of input/output ports, that is characteristic of switching nodes that provide for output-queuing. Similarly, the invention provides a new and improved switching node which provides for the linear increase in packet queues, relative to increasing numbers of input/output ports, that is characteristic of switching nodes that provide for input queuing, while avoiding the relative inefficient usage of the switching fabric interconnecting input and output ports that is characteristic of a switching node that provides for input-queuing of packets transferred by the switching node.

In brief summary, the invention provides a switching node, including a plurality of input port modules, a plurality of output port modules and a switching fabric for transferring packets in a network, each packet including a destination address. Each input port module is connected to a communication link for receiving packets thereover, and each output port module is connected to a communication link for transmitting packets thereover. Each input port module, upon receiving a packet from the communication link connected thereto, buffers the packet and generates a meta-data packet therefor, the meta-data packet identifying the output port module that is to transmit the packet, and generates identifier information for the packet, in particular the identification of the input port module in which the packet is buffered and a pointer to the location in the input port module in which the packet is buffered. After generating the meta-data packet, the input port module provides it to the switching fabric, in particular to a packet meta-data processor portion thereof.

The switching fabric includes both the packet meta-data processor portion and a packet switch portion. The packet meta-data processor portion receives the meta-data packets generated by all of the input port modules and operational status information from all of the output port modules. The operational status information for each output port module includes information that is useful in making a determination for each respective output port module as to whether or not packets that would be transmitted by the respective output port module are to be discarded, or dropped. For each output port module, the packet meta-data processor processes the meta-data packets received from all of the input port modules in connection with the operational status information. If, in processing a meta-data packet, the packet meta-data processor determines that the packet associated with the meta-data packet is to be dropped, it will notify the input port module in which the packet is buffered, which, in turn, will discard the packet. On the other hand if the packet meta-data processor determines that the packet associated with the meta-data packet is not to be dropped, it will enqueue the meta-data packet for the associated output port module.

Each output port module retrieves meta-data packets from its respective meta-data packet queue maintained therefor by the packet meta-data processor. For each meta-data packet retrieved by an output port module, the output port module will issue a request to the input port module identified in the meta-data packet to transfer the packet identified in the input port module to it (that is, to the output port module that issued the request). The input port module, after receiving the request from the output port module, will transfer the requested packet through the packet switch portion of the switching fabric. The packet switch portion, in turn, will transfer the packet to the output port module, for transmission thereby over the communication link connected thereto.

A switching node constructed in accordance with the invention provides the scalability of a input-queued switching node, while maintaining substantially the efficiency of switching fabric usage of an output-queued switching node. Since the packets are buffered at the input port modules until the determination has been made by the packet meta-data processor that they are to be transmitted by respective output port modules, and further until they are requested by the respective output port modules for to be transferred thereto for transmission, only "N" buffers, or queues, are needed, one for each input port module, whereas in an output-queued switching node $N^2$ buffers would be required. However, the determination as to which packets should be discarded (that is, which packets should be dropped) and which should not be (that is, which packets should be passed), is made separately for each output port module effectively in a queue established therefor, and so the pass/drop determinations are effectively made in a manner similar to that for an output queued switching node. Thus, the packet switch portion of the switching fabric an achieve efficiencies similar to those achieved in output queued switching nodes.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
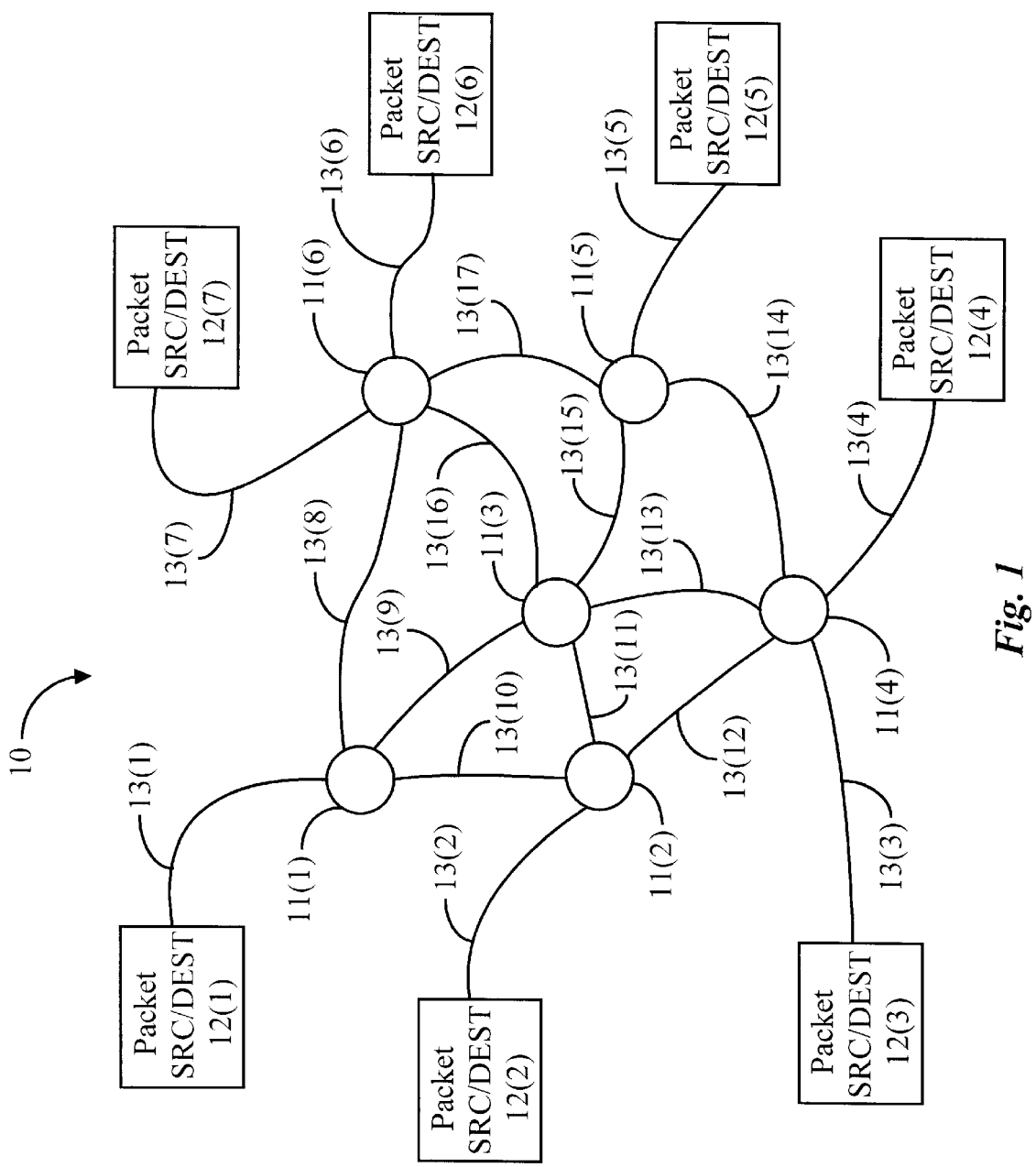
FIG. 1 schematically depicts a computer network including at least one switching node constructed in accordance with the invention.

FIG. 1 schematically depicts a computer network 10 including a plurality of switching nodes 11(1) through 11(N) (generally identified by reference numeral 11($n$)) for transferring signals representing data among a number of devices, which in FIG. 1 are represented by packet source/destination devices 12(1) through 12(M) (generally identified by reference numeral 12($m$)) in a wide area network ("WAN"). The packet source/destination devices 12($m$), as is conventional, include a particular device, such as a computer system or other device that stores, generates, processes or otherwise uses digital data, a local area network of such devices, or the like (not separately shown) to the wide area network 10. Each packet source/destination device 12($m$) is connected over a communication link, generally identified by reference numeral 13($p$), to a switching node 11($n$) to facilitate transmission of data thereto or the reception of data therefrom. The switching nodes 11($n$) are interconnected by communication links, also generally identified by reference numeral 13($p$) to facilitate the transfer of information among the respective switching nodes 11($n$). The communication links 13($p$) may utilize any convenient information transmission medium, including, for example, wires for carrying electrical signals, optical fiber links for carrying optical signals, and so forth. Each communication link 13($p$) is preferably bi-directional, allowing the switching nodes 11($n$) to transmit and receive signals among each other and with customer premises equipment 12($m$) connected thereto over the same link; depending on the particular type of medium selected for respective communication links 13($p$), multiple media may be provided for transferring signals in opposite directions thereby to provide the bidirectional link.

Data is transferred in the network 10 in the form of packets. Generally, a packet includes a header portion and a data portion. The header portion includes information that assists in routing the packet through the network, with the specific information depending on the particular packet routing protocol that is used in routing packets through the network. In connection with network 10, any of a number of well-known packet routing protocols may be used; in one embodiment, the well-known Internet protocol ("IP") is used. In any case, the header typically includes address information including a source address identifying the particular source device 12($m_s$) that generated the packet and a destination address identifying the particular destination address 12($m_D$) that is to receive the packet. In the IP protocol, a packet may be of variable length and the header typically will also include length information to identify the length of the packet. The header also typically includes other information, including, for example, protocol identifier information that identifies the particular protocol that defines the structure of the packet. The data portion contains the data payload of the packet. The packet may also include, as part of the data portion or otherwise, error detection information that can be used to determine whether an error occurred in transferring the packet.

A source device 12($m_s$), after generating a packet for transfer to a destination device 12($m_D$), will provide the packet to the switching node 11(n) connected thereto. The switching node 11(n) will use the destination address in the packet to attempt to identify a "route" which associates a destination address with one of the communication links 13(p) connected thereto over which it is to transfer the packet to forward it (that is, the packet) to either the destination device 12($m_D$), if the switching node 11(n) is connected to the destination device 12($m_D$), or to another switching node 11(n') (n'≠n) along a path to the destination device 12($m_D$). If the switching node can identify a route for the received packet, it will forward the packet over the communication link identified by the route. Each switching node 11(n'), 11(n"), . . . , which receives the packet will perform a similar operation. If all of the switching nodes have respective routes for the destination address, the packet will eventually arrive at the destination device 12($m_D$).

Figure 2:
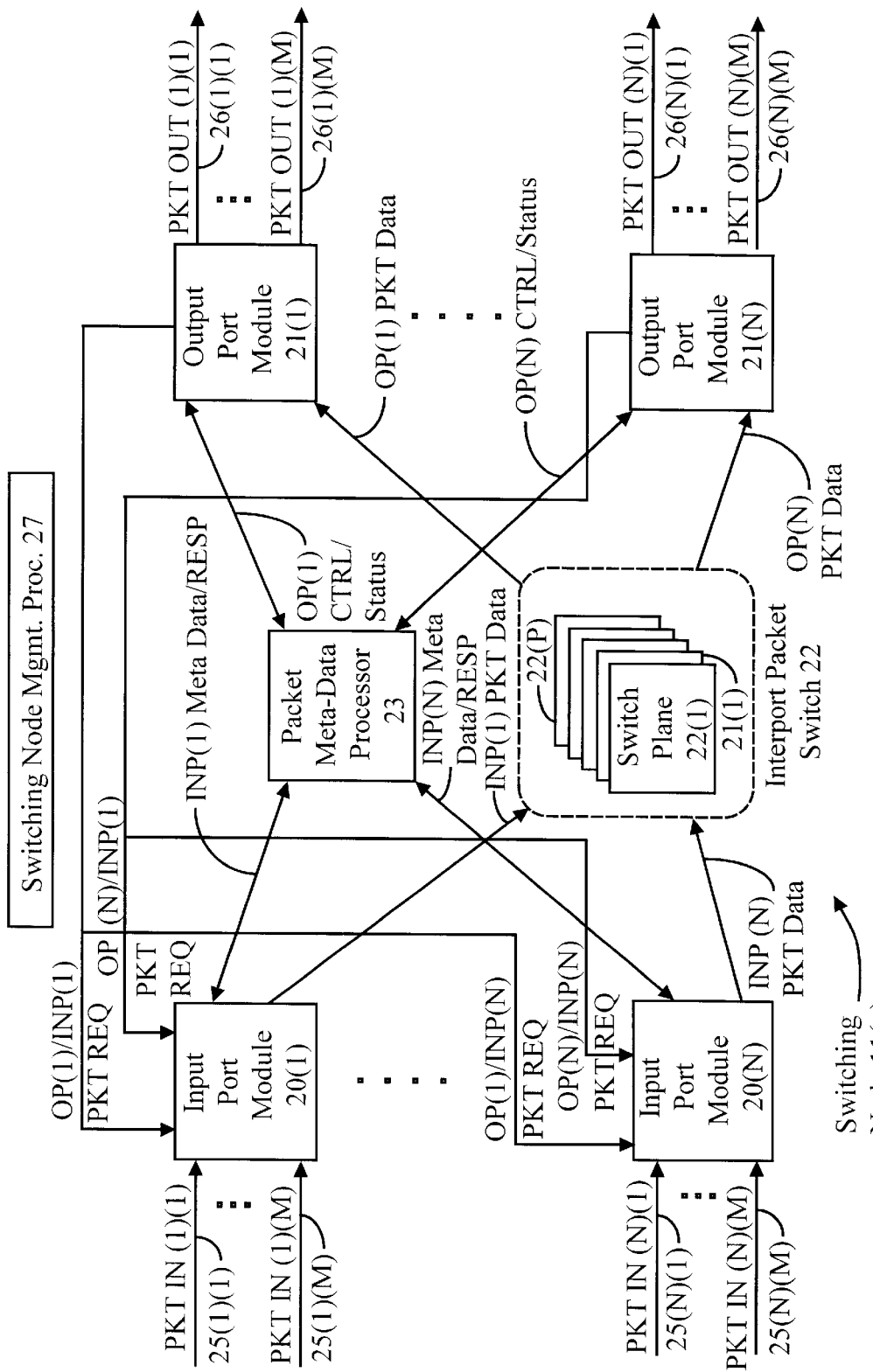
FIG. 2 is a functional block diagram of a switching node for use in the network depicted in FIG. 1, constructed in accordance with the invention.

The invention provides a new switching node 11(n), a functional block diagram of which is depicted in FIG. 2, that provides for the efficient transfer of packets through the network. With reference to FIG. 2, the switching node 11(n) includes a number of input port modules 20(1) through 20(N) (generally identified by reference numeral 20(n)) and a like number of output port modules 21(1) through 21(N) (generally identified by reference number 21(n)) interconnected by a switching fabric consisting of an inter-port packet switch 22, a packet meta-data processor 23, and a switching node management processor 27. Each input port module 20(n) includes one or more input ports 25(n)(1) through 25(n)(M) (generally identified by reference numeral 25(n)(m)), which are connected to respective one of the communication links 13(p) for receiving packets, represented by PKT_IN (n)(m) packet in (n)(m) signals, thereover. For each packet received, the input port module 20(n) buffers the packet and identifies from the destination address contained in the packet's header the appropriate route therefor, in the process identifying the particular output port module 21(n) to which the packet is to be sent and one of one or more output ports 26(n)(1) through 26(n)(M) (generally identified by reference numeral 26(n)(m) on the output port module 21(n) through which the packet is to be transmitted to facilitate forwarding of the packet to the destination device 12($m_D$) or to the next switching node 11(n') along the path to facilitate routing of the packet to the destination device 12($m_D$). Generally, the input port module 20(n) will transfer the packet to the switching fabric, in particular to the inter-port packet switch 22, as represented by INP(n)_PKT_DATA input (n) packet data signals (index "n" being an integer between one and "N," inclusive). The inter-port switch 22, in turn, couples the packet, as represented by OP(n)_PKT_DATA output (n) packet data signals (index "n" being an integer between one and "N," inclusive), to the identified output port module for transmission.

As noted above, each output port module 21(n) includes one or more output ports 26(n)(m), each of which is connected to one or more communication links 13(p). The output port module 21 (n), in turn, transmits over the communication links 13(p) respective ones of the packets, as represented by PKT_OUT packet out signals, that are provided thereto by the switching fabric.

The inter-port packet switch 22, which couples packets from the input port modules 20(n) to the respective output port modules 21(n), is in the form of a crosspoint switch. More specifically, the inter-port packet switch 22 is in the form of a plurality of switch planes 22(1) through 22(P) (generally identified by the reference numeral 22(p)), each of which is in the form of a crosspoint switch. Generally, each input port module 20(n), when it transfers a packet to the inter-port packet switch 22, divides the packet into a series of segments which are transferred to the successive switch planes 22(m) of the inter-port packet switch 22 on a round-robin basis. Similarly, each output port module 21(n), when it receives a packet from the inter-port packet switch 22, will receive successive packet segments from the successive switch planes 22(m) on a round-robin basis, and will re-assemble the segments into a packet prior to transfer through their respective output ports 26(n)(m). Providing multiple switch planes 22(p) in the inter-port packet switch 22 allows for more rapid switching of packets through the inter-port packet switch, allowing for higher through-put of packets from the input port modules 20(n) to the output port modules 21(n). In addition, if a switch plane 22(p) fails or otherwise malfunctions, it can be taken out of the round-robin, and the inter-port packet switch 22 will allow for continued satisfactory switching using the other switch planes 22(p') (p'≠p). In one embodiment, the determination of whether a switch plane 22(p) has failed or otherwise malfunctioned, such that it should be taken out of the round-robin, is based on the bit error rate of the switch plane 22(p) in transferring packet segments from the input port modules 20(n) to the respective output port modules 21(n).

The switching node management processor 27 performs a number of management functions for the switching node 11(n), which will be apparent to those skilled in the art, including, for example, maintaining and updating the route information used by the input port modules 20(n) in identifying, for respective packets, an appropriate output port module 21(n) and output port 26(n)(m) through which the packets are to be transmitted. In addition, the switching node management processor 27 receives bit error rate information for the respective switching planes 22(p) and controls switching of the switch planes 22(p) into and out of the round-robin in response thereto.

In accordance with the invention, in connection with controlling the transfer of packets from each input port module 20(n) to the respective output port modules 21(n) through the switching fabric, after an input port module 20(n) receives a packet over a communication link 13(p) connected thereto, it will buffer the packet and generate a meta-data packet therefor describing the packet, including a pointer to the packet in the input port module 20(n) and the route information, including identification of the output port module 21(n) that is to receive the packet and the output port 26(n)(m) through which the packet is to be transmitted, and perhaps and indication of the length of the packet. After the input port module 20(n) generates a meta-data packet for the packet, it will provide the meta-data packet, as represented by INP(n)_META-DATA/RESP input (n) meta-data/response signals, to the packet meta-data processor 23 in the switching fabric for processing.

The packet meta-data processor 23 also receives information, represented by OP(n)_CTRL/STATUS output port module 21(n) control/status signals, from the respective output port modules 21(n) concerning their operational status, in particular their respective capacities at any point in time to receive additional packets from the input port modules 20(n) for transmission. The output port module 21(n) status information may reflect the conditions of a number of factors, including, for example, the amount of buffering that the output port module 21(n) has available for packets received from the input port modules 20(n) prior to transmission (or, conversely, the amount of buffering currently occupied with packets to be transmitted) whether the available buffering is decreasing, increasing or substantially constant, and the like, all of which will provide an indication of the output port module's capacity to receive packets associated with respective meta-data packets.

After receiving a meta-data packet for each packet from the respective input port module 20(n), the packet meta-data processor 23 will determine whether the current status information that is associated with the output port module 21(n) which is to transmit the packet, indicates that the output port module 21(n) has sufficient capacity to receive the packet from the input port module 20(n) and transmit it (that is, the packet) over the respective communication link 13(p). If the packet meta-data processor 23 makes a positive determination, that is, if it determines that the current status information associated with the output port module 21(n) which is to transmit the packet indicates that it (that is, the output port module 21(n)) has sufficient capacity to receive the packet and transmit it, then the packet meta-data processor 23 will provide the meta-data packet, represented by the OP(n)_CTRL/STATUS signals, to the respective output port module 21(n).

The output port module 21(n), after it receives a meta-data packet from the packet meta-data processor 23 associated with a packet which it (that is, the output port module 21(n)) is to transmit, will subsequently provide a packet request, represented by the OP(n)/INP(n)_PKT_REQ output(n)/input(n) packet request signal (indices "n" in both cases being integers, whose values may differ), to enable the input port module 20(n) that is buffering the packet to transfer the packet thereto through the inter-port packet switch 22. After receiving the packet request from the output port module 21(n), the input port module 20(n), transmits the packet, represented by INP(n)_PKT_DATA input (n) packet data signals, to the inter-port packet switch 22, which, in turn, couples the packet, represented by OP(n)_PKT_DATA output(n) packet data signals, to the output port module 21(n) for transmission as described above.

On the other hand, if the packet meta-data processor 23, after receiving from an input port module 20(n) a meta-data packet for a packet, determines that the operational status of the output port module 21(n) that is to transmit the packet indicates that the capacity of the output port module 21(n) is such that the output port module 21(n) will not be able to transmit the packet, it (that is, the packet meta-data processor 23) will provide a notification, represented by the INP(n)_META-DATA/RESP input(n) meta-data/response signals, to the input port module 20(n) from which the meta-data packet was received. This may occur if, for example, the status information associated with the output port module 21(n) as maintained by the packet meta-data processor 23 indicates that the output port module 21(n) is congested when the input port module 20(n) provides to the packet meta-data processor 23 the meta-data packet for a packet that would otherwise be transmitted by the to output port module 21(n). In that case, since the output port module 21(n) will be unable to transmit the packet, the input port module 20(n) can discard it (that is, the packet) to free buffer space for additional packets that may be received over the communication links connected thereto. In addition, the packet meta-data processor 23 will discard the meta-data packet associated with the packet to be discarded, instead of forwarding the meta-data packet to the output port module 21(n). Unless the input port module 20(n) receives a notification from the packet meta-data processor 23 that the packet is to be discarded, it will normally be requested by the output port module 21(n) for transmission over one of the communication links 13(p) connected thereto.

Accordingly, it will be appreciated that decisions within the switching node 11(n) as to whether a packet that is received over the network, will be transmitted by the switching node, is made by the packet meta-data processor 23, in response to a meta-data packet provided thereto by the input port module 20(n) and based on operational status information provided thereto by the output port modules 21(n). If the packet meta-data processor 23 determines, after receiving a meta-data packet for a packet, that the output port module 21(n) that is to transmit the packet has the capacity to receive and transmit the packet, the packet meta-data processor 23 will provide the meta-data packet for the packet to the output port module 21(n), which, in turn, will initiate forwarding of the packet to it (that is, the output port module 21(n)) by the input port module 20(n) to facilitate transmission of the packet by the output port module 21(n). On the other hand, if the packet meta-data processor 23 determines, after receiving the meta-data packet for a packet, that the output port module 21(n) that would transmit the packet does not have the capacity to receive and transmit the packet, the output port module 21(n) will not receive the meta-data packet for the packet, but instead the packet meta-data processor 23 will enable the input port module 20(n) to discard the packet. The input port module 20(n) will buffer the packet until it receives either notification from the output port module 21(n) to forward ("pass") the packet to it (that is, the output port module 21(n)) for transmission, or notification from the packet meta-data processor 23 to discard ("drop") the packet, thus the input port module 20(n) provides for input queuing of the packets received thereby.

On the other hand, the packet meta-data processor 23 effectively provides for output queuing of information used in making the pass/drop decision. However, since the packet "pass/drop" decision made by the packet meta-data processor 23 can be made on a meta-data packet which typically will be much smaller that the size of the packet, and which need include only a pointer to the packet in the input port module 20(n) which received the packet, the identification of the output port module 21(n) which is to receive the packet for transmission, and perhaps the length of the packet, the amount of data transferred to the packet meta-data processor 23 is significantly smaller that the amount of data typically transferred in a conventional output-queued arrangement, which is generally the entire packet. Thus, the switching node 11(n) constructed in accordance with the invention avoids use of packet-switching bandwidth to transfer packets to the output port module 21(n) that will ultimately be discarded thereby, as is typical of output-queued switching nodes.

Further, since the output port module 21(n) that is to transmit a packet enables the input port module 20(n) that is buffering the packet to transfer it (that is, the packet) through the inter-port packet switch 22 to the respective output port module 21(n) when it is to transmit the packet, the inter-port switch 22 is able to operate at a much higher degree of efficiency that is characteristic of input-queued switching nodes.

Figure 3:
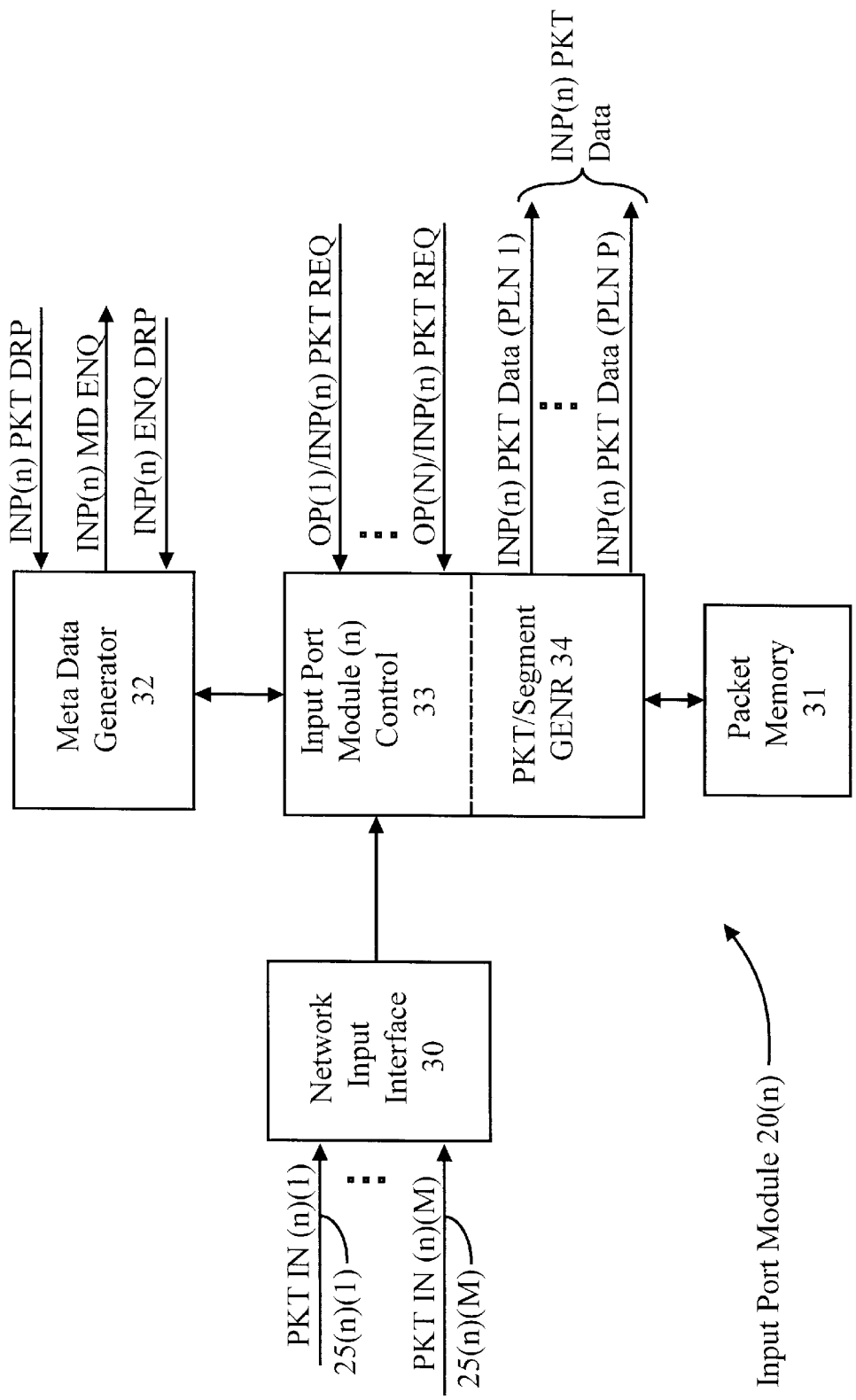
FIG. 3 is a functional block diagram of an input port module used in the switching node depicted in FIG. 2.

Functional block diagrams of an input port module 20(n), a switch plane 22(m), a packet meta-data processor 23 and an output-port module 21(n) used in the switching node 11(n) depicted in FIG. 2 are depicted in FIGS. 3, 4, 5, and 6, respectively. With reference to FIG. 3, an input port module 20(n) used in the switching node 11(n) includes a network input interface 30, a packet memory 31, a meta-data packet generator 32, all controlled by an input port module 20(n) control circuit 33. The network input interface 30 includes the input ports 25(n)(m), which are connected to receive the PKT_IN(n)(1) through PKT_IN(n)(M) (generally, PKT_IN(n)(m)) packet input signals that are representative of packets over respective communication links 13(p). In one embodiment, each input port 25(n)(m) forms part of an add/drop multiplexer constructed in accordance with the well-known SONET specification, although it will be appreciated that other types of input ports may be used. The network input interface 30 couples the received packets as PKT_DATA packet data signals to the input port module 20(n) control circuit 33. The input port module 20(n) control circuit 33, in turn, buffers the packets received from the network interface 30 in the packet memory 31.

In addition, for each buffered packet, the input port module 20(n) control circuit 33 provides information to the meta-data packet generator 32 to enable it (that is, the meta-data packet generator 32) to generate meta-data packet for the packet. The information provided to the meta-data packet generator includes such information as the destination address for the packet, a pointer to the packet in the packet memory 31, and perhaps information as to the length of the packet. The meta-data packet generator 32, which stores route information provided thereto by the switching node management processor 27, uses the destination address for the packet to identify the output port module 21(n) and the output port 26(n)(m) thereof that is connected to the communication link 13(p) over which the packet is to be transmitted. If the meta-data packet generator 32 is able to identify, from the route information, an appropriate output port module 21(n) and output port 26(n)(m), the meta-data packet generator 32 generates therefrom and from the pointer to the packet in the packet memory, and perhaps the packet length information, a meta-data packet for the packet and provides the meta-data packet to the packet meta-data processor 23, as represented by INP(n)_M-D_ENQ input (n) meta-data packet enqueue signals. As will be described below, the meta-data packet generator 32 specifically determines, from the destination address provided by the input port module 20(n) control module 53, the identification of the output port module 21(n) that is to receive the packet and the output port module 26(n)(m) through which the packet is to be transmitted, and provides that identification along with an identifier for the input port module 20(n), the pointer to the packet in the packet memory, and perhaps the length information, to the packet meta-data processor 23 as the meta-data packet.

As noted above, the switching node may not have appropriate route information for some destination addresses. If the meta-data packet generator 32 determines that it does not have route information for a destination address provided thereto by the input port module 20(n) control circuit 33, it (that is, the meta-data packet generator) can so notify the input port module 20(n) control circuit 33. The input port module 20(n) control circuit 33 can, in turn, perform predetermined operations as will be apparent to those skilled in the art, which may include, for example, discarding the packet associated with the destination address from the packet memory. In addition, the input port module 20(n) control circuit 33 can itself generate a packet for transmission to the source device 12($m_s$) for the packet indicating that the packet was not delivered to the destination device 12($m_D$) to which it was addressed. The input port module 20(n) control circuit 33 can enable the generated packet to be transferred in the same manner as packets received thereby.

The meta-data packet generator 32 also receives two control signals from the packet meta-data processor, including an INP(n)_ENQ_DRP input(n) enqueue drop signal and an INP(n)_PKT_DRP input(n) packet drop signal. If the packet meta-data processor 23 is unable to receive the meta-data packet from the meta-data packet generator 32, which may occur if the packet meta-data processor 23 is congested as described below in connection with FIG. 5, when the meta-data packet generator 32 attempts to provide a meta-data packet thereto, the packet meta-data processor 23 will assert the INP(n)_ENQ_DRP input(n) enqueue drop signal to indicate that it is unable to accept the meta-data packet. If the meta-data packet generator 32 receives the asserted INP(n)_ENQ_DRP input(n) enqueue drop signal from the packet meta-data processor 23 when it (that is the meta-data packet generator 32) provides a meta-data packet thereto, the meta-data generator 32 will enable the input port module 20(n) control circuit 33 to discard the packet from the packet memory 31. On the other hand, if the packet meta-data processor 23 is able to receive the meta-data packet from the meta-data packet generator 32, it will not assert the INP(n)_ENQ_DRP input(n) enqueue drop signal, but instead will accept the meta-data packet for processing.

As noted above, the packet meta-data processor 23 processes meta-data packets accepted thereby to determine whether the current status information that is associated with the output port module 21(n) which is to transmit the packet, indicates that the output port module 21(n) has sufficient capacity to receive the packet from the input port module 20(n) and transmit it (that is, the packet) over the respective communication link 13(p). If the packet meta-data processor 23, after accepting the meta-data packet for processing, makes a negative determination, that is, if it determines that the output port module 21(n) does not have sufficient capacity to receive and transmit the packet, it (that is, the packet meta-data processor 23) will assert the INP(n)_PKT_DRP input(n) packet drop signal, in the process providing an identification of the particular packet buffered by input port module 20(n) that is to be dropped. If the meta-data packet generator 32 receives the asserted INP(n)_PKT_DRP input (n) packet drop signal from the packet meta-data processor 23; it will notify the input port module 20(n) control circuit 33, which, in turn, will discard the packet identified by the INP(n)_PKT_DRP input(n) packet drop signal from the packet memory.

The input port module 20(n) control circuit 33 also receives packet transfer requests from the output port modules 21(n) and, using a packet segment generator 34, controls retrieval and transfer of packets from the packet memory 31 to the inter-port packet switch 22 for transfer to the output port modules 21(n). The packet transfer requests are represented by OUT(1)/INP(n)_PKT_REQ output (1)/input(n) packet request through OUT(N)/INP(n)_PKT_REQ output(N)/input (n) packet request signal (generally, "OUT(n')/INP(n)_PKT_REQ," where index "n" is an integer between one and "N," and may, but need not, equal the value of index "n"), and the packet data provided by the input port module 20(n) is represented by the INP(n)_PKT_DATA input (n) packet data signal. After the input port module 20(n) control module 33 receives a packet transfer request from an output port module 21(n'), which packet transfer request includes a pointer to the packet to be provided in response to the request, the input port module 20(n) control circuit 33 enables the packet segment generator 34 to retrieve the requested packet from the packet memory 31, divide the packet into the respective segments transfers them, as INP(n)_PKT_DATA_PLN(1) input packet data plane (1) through INP(n)_PKT_DATA_PLN (P) input packet data plane (P) signals (which together form the INP(n)_PKT_DATA input (n) packet data signals) to the inter-port packet switch 22, along with the identification of the output port module 21(n') that is to transmit the packet. As described above in connection with FIG. 2, the inter-port packet switch 22, in turn, will transfer the packet received from the input port module 20(n) to the output port module 21(n') for transmission.

Figure 4:
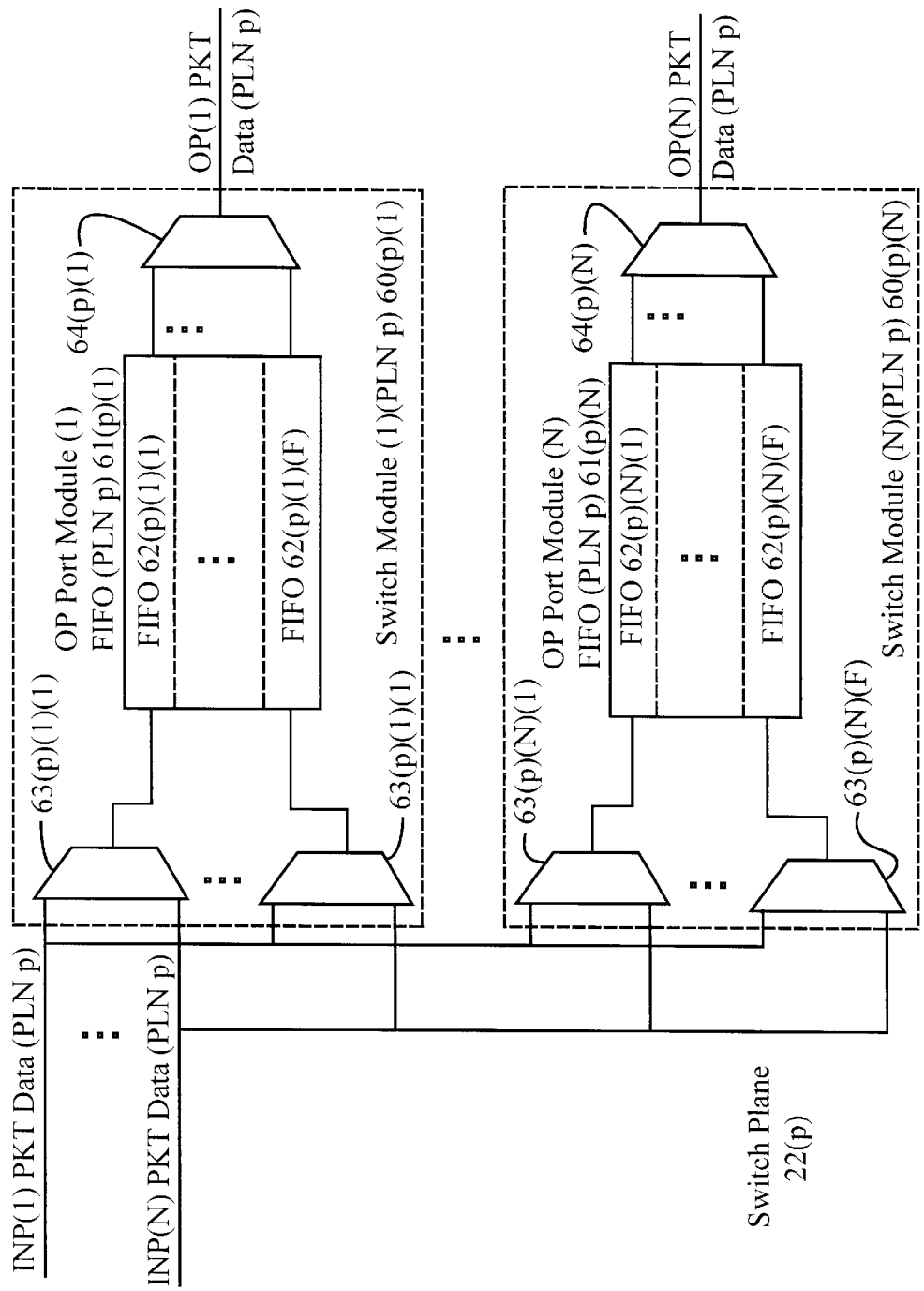
FIG. 4 is a functional block diagram of one switch plane in the inter-port packet switch used in the switching node depicted in FIG. 2.

A functional block diagram of a switch plane 22(p) used in the inter-port packet switch 22 is depicted in FIG. 4. With reference to FIG. 4, the switch plane 22(p) includes a plurality of switch modules 60(p)(1) though 60(p)(N) (generally identified by reference numeral 60(p)(n)), each of which is associated with and provides packet segments from packets to be transferred to the correspondingly-indexed output port module 21(n). Each switch module 60(p)(n) includes a FIFO (first-in-first out buffer) module 61(p)(1) though 61(p)(N) (generally identified by reference numeral 61(p)(n)), each of which includes a plurality of FIFO's 62(p)(n)(1) through 62(p)(n)(F) (generally identified by reference numeral 62(p)(n)(f)). Each switch module 60(p)(n) also includes a plurality of input multiplexers 63(p)(n)(1) through 63(p)(n)(F) (generally identified by reference numeral 63(p)(n)(f)), each of which provides an input to the correspondingly indexed FIFO 621(p)(n)(f), and one output multiplexer 64(p)(n). Each input multiplexer 62(p)(n)(f) controlled by the switching node management processor 27 (FIG. 2) to enable it to couple the INPUT(n)_PKT_DATA_(PLN_p) input (n) packet data (plane (p)) signals from an input port module 20(n) to the FIFO 62(p)(n)(f) connected thereto, when the packet segment represented by those signals is to be transferred to the correspondingly-indexed output port module 21(n) for transfer over the network. The output multiplexer 64(p)(n) in each switch module 60(p)(n) is controlled by the respective output port module 21(n) to enable it (that is, the output port module 21(n) to receive packet segments from the various FIFO's 62(p)(n)(f) in the switch module 60(p)(n) associated therewith. Generally, each output port module 21(n) will control the multiplexer 64(p)(n) to enable it (that is, the output port module 21(n)) to receive packet segments from all of the various FIFO's 62(p)(n)(f) in which input port modules 20(n) are loading packet segments on a round-robin basis, so as to avoid having one or more of the FIFO's becoming full which may occur if the output port module 21(n) receives packet segments for a complete packet from one FIFO 62(p)(n)(f) at a time.

It will be appreciated that, if there are "N" FIFO's in each switch module 60(p)(1) (that is, if "F" is equal to "N"), then the inter-port packet switch 22 will effectively be non-blocking, all of the input packet modules 20(n) will be able to transfer packets to any of the output port modules at any point in time.

Figure 5:
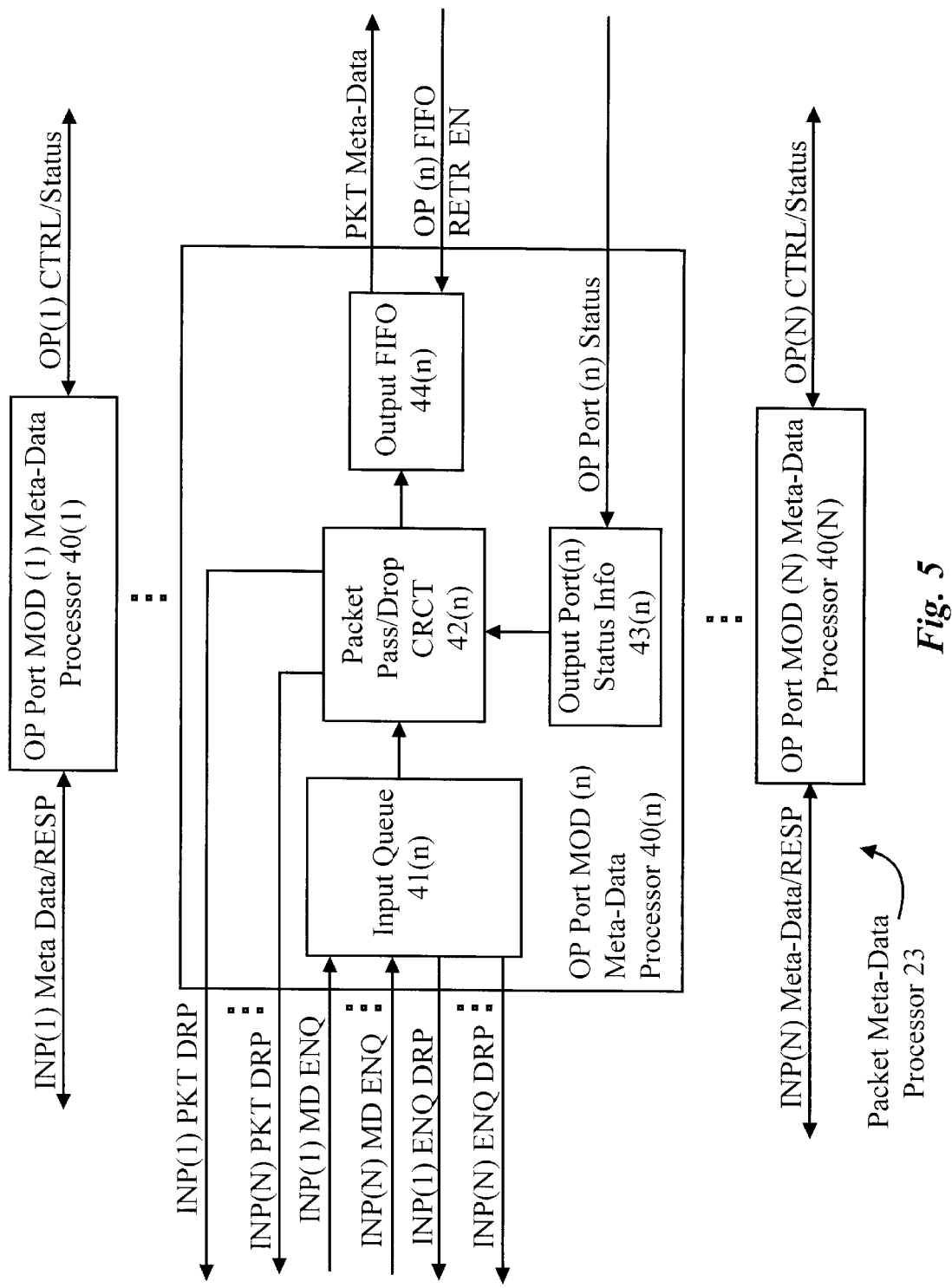
FIG. 5 is a functional block diagram of a meta-data packet processor for processing packet meta-data in the switching node depicted in FIG. 2.

A functional block diagram of packet meta-data processor 23 used in the switching node 11(n) depicted in FIG. 2 is depicted in FIG. 5. With reference to FIG. 5, the packet meta-data processor 23 comprises a plurality of processor modules 40(1) through 40(N) (generally identified by reference numeral 40(n)), each of which is associated with, and makes packet pass/drop determinations for, the correspondingly-indexed output port module 21(n). The processor modules 40(n) are all generally similar. Each processor module 40(n) includes an. input queue 41(n), a packet pass/drop circuit 42(n), an output port module (n) status information store 43(n) and an output FIFO (first in/first out buffer) 44(n). The input queue 41(n) receives meta-data packets from all of the input port modules 20(n) and organizes them in a single queue for processing by the packet pass/drop circuit 42(n). The input queue 41 (n) receives the meta-data packet enqueue requests, represented by the INP(1)_M-D_ENQ input(1) meta-data packet enqueue through INP(N)_M-D_ENQ input(N) meta-data packet enqueue signals (generally, "INP(n)_M-D_ENQ"). Each meta-data packet enqueue request includes the meta-data packet, as generated by the meta-data generator 32, which, as noted includes an identifier for the input port module 20(n), the pointer to the packet in the packet memory, and perhaps the length information identifying the length of the packet associated with the meta-data packet.

If, when a meta-data packet enqueue request is received from an input port module 20(n), the processor module 40(n) is able to receive and enqueue the meta-data packet in the input queue 41(n), it will do so. However, if, when a meta-data packet enqueue request is received from an input port module 20(n), the processor module 40(n) is not able to receive and enqueue the meta-data packet in the input queue 41(n), it will so notify the input port module 20(n) by asserting the INP(n)_ENQ_DRP input(n) enqueue drop signal. This may occur if, for example, the input queue 41(n) is full or if the population of meta-data packets in the input queue 41(n) is above a predetermined threshold. As noted above, if the processor module 40(n) notifies an input port module 20(n) that it is not able to receive and enqueue a meta-data packet therefrom, by asserting the INP(n)_ENQ_DRP input (n) enqueue drop signal, the input port module 20(n) will discard the packet associated with the meta-data packet.

The input queue 41(n) couples the meta-data packets enqueued therein in order to the packet pass/drop circuit 42(n). The packet pass/drop circuit 42(n), in turn, for each meta-data packet coupled thereto by the input queue 41(n), makes a pass/drop determination based on status information for the output port module 21(n) associated with the processor module 40(n), which is stored in the output port module (n) status information store 43(n). The status information in the provide store 43(n) is provided by the associated output port module 21(n), as represented by the OP_PORT(n)_STATUS output port (n) status signal, which forms one of the OUT(n)_CTRL/STATUS output (n) control/status signals that is depicted in FIG. 2 as being transferred between the packet meta-data processor 23 and output port module 21(n). The output port status information stored in the store 43(n) reflects the output port module's operational status, in particular its capacity at any point in time to receive additional packets from the input port modules 20(n) for transmission, and may be a function of the amount of buffering that the output port module 21(n) has available to buffer packets retrieved from the input port modules 20(n) for transmission, and whether the available buffering is increasing, decreasing or substantially constant. When the packet pass/drop circuit 42(n) receives a meta-data packet from the input queue 41 and makes a pass/drop determination in connection therewith, if the status information in the store 43(n) indicates that the output port module 21(n) has the capacity to receive additional packets from the input port modules 20(n) for transmission, it (that is, the packet pass/drop circuit 42(n) will load the meta-data packet in the output FIFO 44(n). The packet pass/drop circuit 42 can also adjust the status information as stored in the status information store 43(n) to reflect the fact that a meta-data packet for an additional packet to be retrieved and transmitted by the output port module 21(n) has-been loaded into FIFO 44(n). For example, if the meta-data packet provides length information identifying the length of the packet associated with the meta-data packet, and if the status information in store 43(n) provides information as to the amount of buffering the output port module 21(n) has available, the packet pass/drop circuit 42(n) can, for example, decrement the status information stored in the store 43(n) to reflect the length of the packet associated with the meta-data packet.

On the other hand, when the packet pass/drop circuit 42(n) receives a meta-data packet from the input queue 41 and makes a pass/drop determination in connection therewith, if the status information in the store 43(n) indicates that the output port module 21(n) does not have the capacity to receive additional packets from the input port modules 20(n) for transmission, it will provide a drop notification to the input port module 20(n) from which the meta-data packet was received, as represented by the asserted INP(n)_PKT_DRP input (n) packet drop signal, and provide therewith a pointer to the packet that is associated with the meta-data packet. As described above, when the input port module 20(n) receives the notification from the processor module 40(n), it (that is, the input port module 20(n)) can discard the packet.

The output FIFO 44(n) is connected to provide the meta-data packets to the output port module 21(n) that is associated with the processor module 40(n). When the output port module 21(n) determines that it is in condition to receive the packet from the input port module 20(n), it will provide an output FIFO retrieval request, represented by the asserted OUT(n)_FIFO_RETR_EN output(n) FIFO retrieval enable signal, which comprises one of the OUT (n)_CTRL/STATUS output(n) control status signals that is depicted on FIG. 2 as being transferred between the packet meta-data processor 23 and the output port module 21(n). In response to the output FIFO retrieval request from the output port module 21(n), the processor module 40(n) will transfer to the output port module 21(n) the meta-data packet, as represented by a PKT_META-DATA packet meta-data signals, which comprises OUT(n)_CTRL/STATUS output (n) control status signals that is depicted on FIG. 2 as being transferred between the packet meta-data processor 23 and the output port module 21(n), that is at the head of the output FIFO 44(n).

Figure 6:
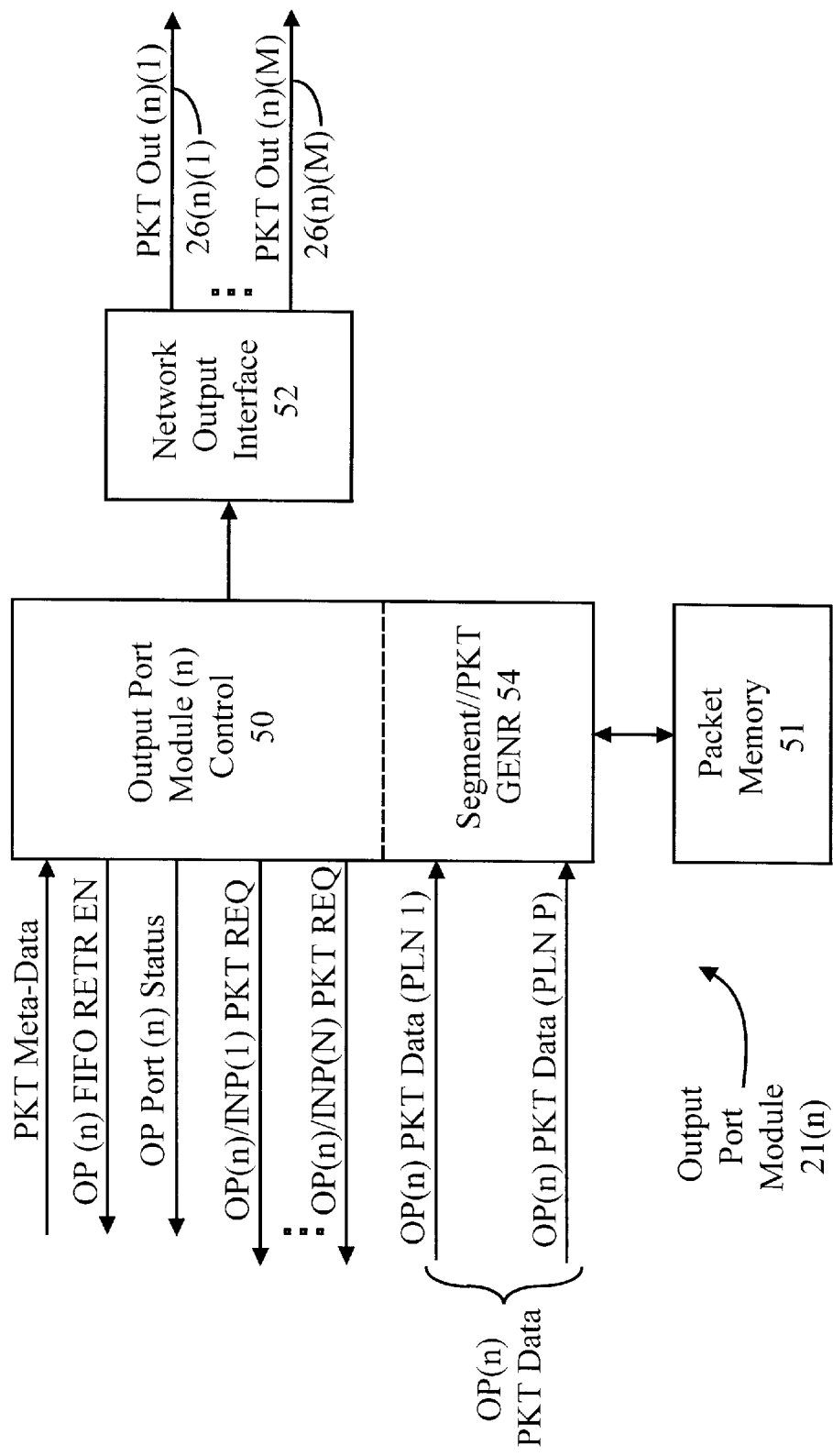
FIG. 6 is a functional block diagram of an output port module used in the switching node depicted in FIG. 1.

After an output port module 21(n) retrieves a meta-data packet from its associated processor module 40(n) (FIG. 5) in the packet meta-data processor 23 (FIG. 2), it (that is, the output port module 21(n)) will enable the input port module 20(n) in which the packet is buffered to transfer the packet to it through the inter-port packet switch 22. A functional block diagram of the output port module 21(n) used in switch 11(n) is depicted in FIG. 6. With reference to FIG. 6, the output port module 21(n) includes an output port module 21(n) control circuit 50, a packet memory 51 and a network output interface 52. The output port module 21(n) control circuit 50 connects to the other components of the switching node 11(n) and (i) provides, to the processor module 40(n) associated with the output port module 21(n) in the packet meta-data processor 23 for use in its pass/drop determinations, and updates the operational status information that reflects the current capacity of the output port module 21(n) to receive packets from the input port modules 20(n) for transmission over the communication links 13(p) connected thereto;

(ii) retrieves meta-data packets from the processor module 40(n) which the packet pass/drop circuit 42(n) has passed and loaded into the output FIFO 44(n), and (iii) initiates transfer by the respective input port modules 20(n) of the packets associated with the retrieved meta-data packets (reference item (ii) above) to the output port module 21(n) through the inter-port packet switch 22.

Generally, the output port module 21(n) control circuit 50 generates meta-data packet retrieval requests, represented by the OUT(N)_FIFO_RETR_EN output port module 21(n) FIFO retrieval enable signal, and provides them to the packet meta-data processor 23, in particular to the output FIFO 44(n) of the processor module 40(n) that is associated with the output port module 21(n) to initiate retrieval of a meta-data packet (reference item (ii) above). In response to each meta-data packet retrieval request, the output FIFO 44(n) will, if it has a meta-data packet for the output port module 21(n), provides a meta-data packet, as represented by the PKT_META-DATA signals, to the output port module 21(n) control circuit 50.

After retrieving a meta-data packet, the output port module 21(n) control circuit 50 will enable the input port module 20(n) identified in the meta-data packet to transfer the packet to the output port module 21(n) (item (iii) above). In that operation, the output port module 21(n) control circuit 50 will generate a packet transfer request, represented by the OUT(n)/INP(n')_PKT_REQ output(n)/input(n') packet request signal, for transfer to the input port module 20(n') that is buffering the packet. Each packet transfer request includes the pointer to the packet to be transferred, which the output port module 21(n) control circuit 50 obtains from the retrieved meta-data packet. As noted above in connection with FIG. 3, after the input port module 20(n') receives the packet transfer request, it retrieves the packet from its internal buffer and provides the packet to the inter-port packet switch 22 for transfer to the output port module 21(n).

The inter-port packet switch 22, in turn, will transfer the packet to the output port module 21(n) control circuit 50, as represented by the OUT(n)_PKT_DATA output(n) packet data signal. More specifically, the various switch planes 22(p) comprising the inter-port packet switch 22 provide respective OP(n)_PKT_DATA_(PLN_1) output (n) packet data (plane 1) through OP(n)_PKT_DATA_(PLN_ P) output (n) packet data (plane P) signals, representing respective packet segments, to a segment/packet generator 54. The segment/packet generator 54 serves to regenerate the various packets to be received from the inter-port packet switch 22, which will be buffered in the packet memory 51 prior to transfer.

After the output port module 21(n) control circuit 50 receives a packet from the inter-port packet switch 22, it will be provided to the network interface 52 for transmission over the appropriate communication link 13(p). Generally, prior to transmission, the output port module 21(n) control circuit 50 will buffer the packet in the packet memory 51. The network output interface 52 includes the output ports 26(n)(m), which are connected to communication links 13(p) to facilitate transmission of packets, represented by PKT_OUT(n)(1) through PKT_OUT(n)(M) (generally, PKT_OUT(n)(m)) packet input signals. In one embodiment, each output port 26(n)(m) forms part of an add/drop multiplexer constructed in accordance with the well-known SONET specification, although it will be appreciated that other types of input ports may be used.

As noted above, the output port module 21(n) control circuit 50 also provides and updates the operational status information that reflects the current capacity of the output port module 21(n) to receive packets from the input port-modules 20(n) for transmission over the communication links 13(p) connected thereto, to the processor module 40(n) associated with the output port module 21(n) in the packet meta-data processor 23 for use in its pass/drop determinations (reference item (i) above). In that connection, the operational status information will preferably reflect the amount of buffering that is available in the packet memory 51, and may also indicate whether the amount is increasing, decreasing or remaining constant, all of which provide information as to the capacity of the output port module's current ability to receive packets from the input port modules 20(n). It will be appreciated that, if the operational status information reflects the amount of buffering available in the packet memory, as the output port module 21(n) transmits packets it can update the operational status information by enabling the information in the status information store 43(n) to be incremented by a value reflecting the lengths of the respective packets.

As noted above, and with reference to FIG. 3, the input port module 20(n) control circuit 33 provides to the meta-data generator 32 information regarding each packet received from the network input interface 30 and buffered in packet memory 31, including the destination address and a pointer to the packet in the memory 31, and the meta-data generator 32 generates a meta-data packet therefor for transfer to the packet meta-data processor 23. In generating the meta-data packet, the meta-data generator 32 identifies, from the destination address, the appropriate route, if it has one, which identifies the particular output port module 21(n) that is to receive the packet and the one of the output ports 26(n)(m) through which the packet is to be transmitted to transmit the packet to the destination device 12($m_D$) or the next switching node in the network along the path to the destination device 12($m_D$).

By way of background, in one embodiment, in which the IP packet routing protocol is used, the appropriate route for a packet is not necessarily identified based on an exact match between the destination address in the packet and the switching node's route information. Instead, the appropriate route is selected based on a match between the longest "prefix" in the destination address, the prefix comprising the high-order bits of the destination address. As noted above, each route includes address information and the identification of an output port module 21(n) and the output port 26(n)(m), and a match is determined by comparing the prefix and the address information portion of the route. Currently, an IP address (a source address or a destination address as used above) is in the form of a thirty-two bit integer having the form $A_{31} \ldots A_0$, where each "$A_i$" is a binary digit. Thus, the appropriate route is the one for which the longest series of bits $A_{31} \ldots A_j$ (that is, for which index "j" is a minimum) matches the address information in a route as maintained by the switching node. If no match is found for a destination address, then the switching node does not have a route for the particular destination address.

Several mechanisms may be used to determine such matches. For example, routing information may be organized in the form of a plurality of tables, with each table storing routing information for a particular prefix length. In that case, the tables can be processed in order, from the table associated with the longest prefix length to the shorter prefix lengths. The first route for which a match is found in a table between the destination address's prefix and the address information stored in the table is the appropriate route; if not match is found in any of the tables, then the switching node does not have a route for the destination address. However, several problems arise in connection with such an arrangement, most notably that a number of tables may need to be generated and maintained by the switching node, which can add to the complexity of the switching node and the amount of memory required to store the respective tables. In addition, in the general case, a number of tables may be accessed when obtaining routing information for an address, in particular to identify the table which has the appropriate routing information for the address. These problems will be exacerbated if, as currently proposed, the number of address bits used in Internet addresses increases to 128 bits.

Figure 7:
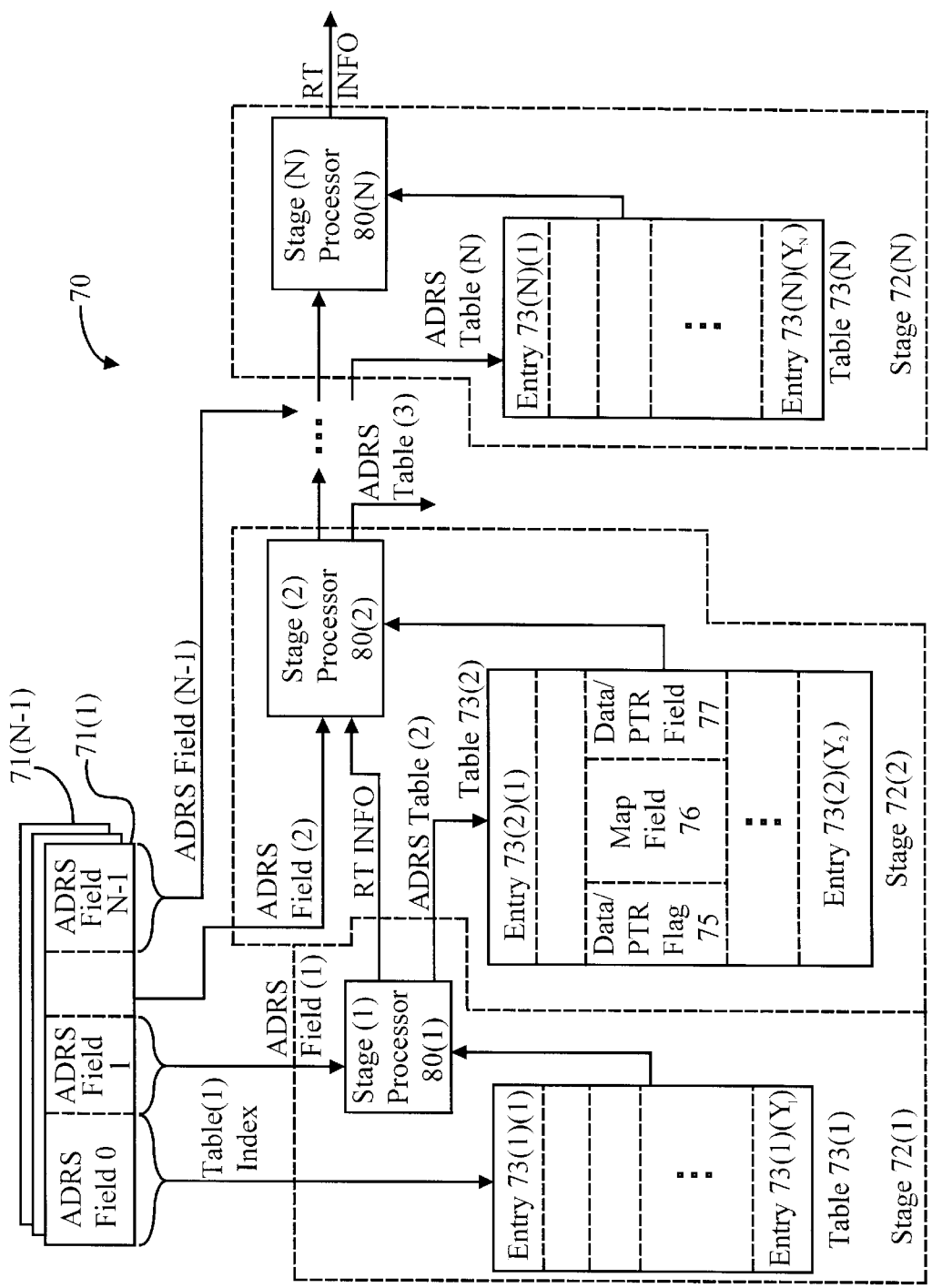
FIG. 7 is a functional block diagram of one embodiment of a frame forwarding engine useful in the input port module depicted in FIG. 3.
Figure 8:
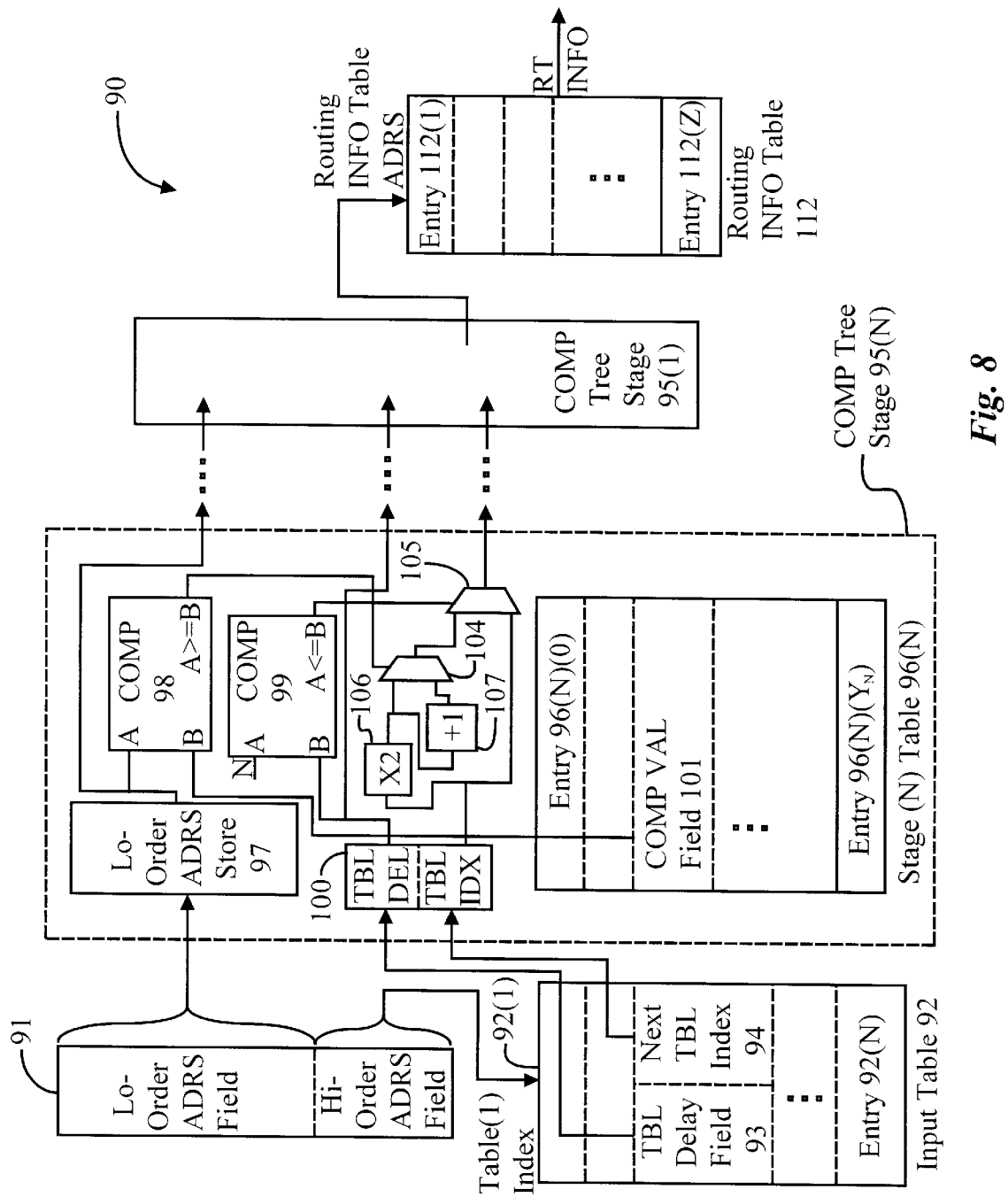
FIG. 8 is a functional block diagram of a second embodiment of a frame forwarding engine useful in the input port module depicted in FIG. 3.

To address these problems, the meta-data generator 32, in one embodiment, makes use of a compressed retrieval tree ("trie") arrangement, and, in an alternate embodiment, makes use of a binary search tree arrangement, to generate the routing information for Internet addresses coupled thereto by the input port module control circuit 33 (FIG. 2). A functional block diagram of the compressed retrieval tree arrangement, identified by reference numeral 70, is depicted in FIG. 7, and a functional block diagram of the binary search tree arrangement, identified by reference numeral 90, is depicted in FIG. 8. In both embodiments, the meta-data generator 32 generates routing information in a pipelined fashion in a plurality of pipeline stages, in each stage performing an operation, as described below in connection with FIGS. 7 and 8, in generating the appropriate routing information. Since the information is generated in a pipelined fashion, the meta-data generator 32 can be performing various processing operations in connection with Internet addresses from a plurality of packets contemporaneously, while reducing the number of tables which might otherwise need to be accessed.

With reference initially to FIG. 7, the compressed retrieval tree arrangement 70 includes a plurality of address registers 71(1) through 71(N−1) (generally identified by reference numeral 71(n)), each associated with one of a plurality of stages 72(1) through 72(N−1). An "N-th" stage 72(N) is also provided, for use as described below. Stages 72(1) through 72(N) will generally be identified herein by reference numeral 72(n). Generation of the routing information proceeds in a series of pipeline stages in which, (i) in a first pipeline stage, address register 71(1) initially receives the Internet address for the packet for which routing information is to be generated, and thereafter the associated stage 72(1) uses a predetermined number of high-order address bits, in two address fields, identified in FIG. 7 as "ADRS_FIELD_0" and "ADRS_FIELD_1" to generate information that is coupled to stage 72(2);

(ii) in a second pipeline stage, the Internet address in stage 71(1) is transferred to address register 71(2). The information coupled by stage 72(1) to stage 72(2), along with a predetermined number of address bits following the high-order address bits, identified in FIG. 7 as "ADRS_FIELD_2," from the Internet address now in address register 71(2), is used by stage 72(2) to generate information that is coupled to stage 72(3), and so forth until, (N−1) in a last "N-1st" pipeline stage, the Internet address in stage "N−1" is transferred to address register 71(N−1). The information coupled by stage 72(N−2) to stage 72(N−1), along with a predetermined number low-address address bits, identified in FIG. 7 as "ADRS_FIELD_N−1" from the Internet address now in address register 71(N−1), is used by stage 72(N−1) to generate information that is coupled to stage 72(N).

It will be appreciated that, for each pipeline stage as described above, when an Internet address is transferred from address register 71(1) to address register 71(2), another Internet address can be shifted into address register 71(1), and so forth for the successive address registers 71(n), facilitating pipelining of processing of the Internet addresses.

Each stage $72(n)$ includes a table $73(n)$ and associated storage and/or processing circuitry. Each of stages $72(1)$ through $71(N-1)$ includes a table $73(n)$, each of which includes a plurality of entries $73(n)(y_n)$. Each entry $73(n)(y_n)$ in turn, includes a plurality of fields, including a data/pointer flag 75, a map field 76 and a data/pointer field 77 (explicity shown in table $73(2)$). The map field 76 includes a series of bits $M_{B-1} \ldots M_0$ (generally identified by "$M_b$") each of which is associated with one of the possible binary encoded values represented by the address bits in the ADRS__FIELD__n in the address register $72(n)$. Generally, if the data/pointer flag 75 is set, then the data/pointer field 77 contains routing information for all addresses associated with the address bits in ADRS__FIELD__n in the address register $72(n)$. On the other hand, if data/pointer flag 75 is clear, but the bit $M_b$ in the map field 76 that is associated with the binary coded value of the address bits in the ADRS__FIELD__n in the address register $72(n)$ is set, then the data/pointer field 77 is used, along with a portion of the map field 76, in generating a pointer to an entry $73(n+1)$ $(y_n+1)$ in a table $73(n+1)$ in the next stage $72(n+1)$.

The map field 76 further includes a default flag $M_B$, which, if the data/pointer flag 75 is clear, is used if the bit $M_b$ associated with the binary-encoded value of the ADRS__FIELD__n in the address register $72(n)$ is clear. If the bit $M_b$ is clear, but the default flag $M_B$ is set, then the data/pointer field 77 is used, along with the entire map field 76, other than the default flag $M_B$ itself, in generating a pointer to an entry $73(n+1)(y+_{n+1})$ in a table $73(n+1)$ in the next stage $72(n+1)$. Finally, if the data/pointer flag 75, bit $M_b$ associated with the binary-encoded value of the ADRS__FIELD__n in the address register $72(n)$, and the default flag $M_B$ are all clear, there is not routing information for the Internet address in the address register $71(n)$.

Stage $72(N)$ also includes a table $73(N)$ including a plurality of entries $73(N)(Y_N)$. In table $73(N)$, however, each entry includes just one field, which, in turn, includes routing information.

The information in the tables $73(n)(Y_n)$ are processed to generate routing information as follows. In stage $72(1)$, the particular entry of the table $73(1)$ that is to be used is pointed to by the binary-encoded value of the ADRS__FIELD__0. Each stage $72(1)$ through $72(N-1)$ further includes a stage (n) processor $80(n)$ that operates as follows. The stage (1) processor $80(1)$ receives the ADRS__FIELD__1 from the address register $72(1)$ and the contents of the fields 75, 76 and 77 from an entry $73(1)(y_1)$ in table $73(1)$ pointed to by ADRS__FIELD__0 and performs a number of operations in response thereto. In particular, the stage (1) processor $80(1)$.

(i) determines whether the data/pointer flag 75 is set, and, if so, provides the data/pointer flag and the contents of the data/pointer field 77 to the next stage $72(1)$, with the set data/pointer flag indicating that the information provided from the data/pointer field 77 comprise routing information ("RT__INFO"), (ii) if the data/pointer flag 75 is clear, but the bit $M_b$ in the map field 76 of the selected entry $73(1)(y_1)$ that is associated with the binary-encoded value of the ADRS__FIELD__1 in address register $72(1)$ is set, counts the number of bits $M_0, M_1, \ldots$, up to, but not including, bit $M_b$, which are set, adds that number to the value contained in the data/pointer field 77, and provides the sum and the data/pointer flag to the next stage $72(2)$, with the clear data/pointer flag indicating that the sum is to be used in identifying an entry $73(2)(y_2)$ in the table $73(2)$ of that stage $72(2)$, (iii) if the data/pointer flag 75 and bit $M_b$ in the map field 76 of the selected entry $73(1)(y_1)$ that is associated with the binary-encoded value of the ADRS__FIELD__1 in address register $72(1)$ are both clear, determines whether the bit $M_B$ is set, and if so, counts the number of bits $M_0, M_1, \ldots$, up to, but not including, bit $M_B$, which are set, adds that number to the value contained in the data/pointer field 77, and provides the sum and the data/pointer flag to the next stage $72(2)$, with the clear data/pointer flag indicating that the sum is to be used in identifying an entry $73(2)(y_2)$ in the table $73(2)$ of that stage $72(2)$; and (iv) if the data/pointer flag 75, the bit $M_b$ in the map field 76 of the selected entry $73(1)(y_1)$ that is associated with the binary-encoded value of the ADRS__FIELD__1 in address register $72(1)$, and the bit $M_B$ are all clear, it (that is, the stage (1) processor $80(1)$) provides a notification to the next stage $72(2)$ that there is no routing information for the address in the address register $72(1)$.

Thus, in connection with items (ii) and (iii) above, it will be appreciated that table $73(2)$ need only have at most a number of entries $73(2)(y_2)$ corresponding to the number of bits $M_0, M_1, M_B$, in the map fields 76 of entries $73(1)(y_1)$ which are set (up to a maximum of "B" entries $73(2)(y_2)$) for those entries $73(1)(y_1)$ for which the data/pointer flags 75 are clear (indicating, as noted above, that the data/pointer field 77 contains a pointer), which can be significantly fewer than if one entry $73(2)(y_2)$ were provided for each entry $73(1)(y_1)$ and for each possible binary-encoded value of the address bits in ADRS__FIELD__2 of address register $72(2)$.

After the stage (1) processor $80(1)$ has generated the output information as described above, the Internet address in address register $72(1)$ will be transferred to address register $72(2)$ for processing by stage $72(2)$. The stage $72(2)$ processes the address bits from the next address field, ADRS__FIELD__2 (not separately shown), in the address in address register $72(2)$ in connection with the output from the stage $72(1)$. As noted above, the stage $72(2)$ includes a table $73(2)$, which is structured similarly to the table $73(1)$ in stage $72(1)$. In addition, the stage $72(2)$ includes a stage (2) processor $80(2)$ which operates in a manner similar to that described above in connection with the stage (1) processor $80(1)$, except that, if the stage $72(2)$ receives information from the stage $72(1)$ for which the data/pointer flag is set, indicating that the information received from stage $72(1)$ is either the routing information, or notification to the stage $72(2)$ that the meta-data generator 32 does not have routing information for the Internet address that is now in the address register $72(2)$, the stage (2) processor $80(2)$ will couple that information to the next stage $72(3)$, and will not perform processing operations in connection with an entry $73(2)(y_2)$ of the table $73(2)$ of that stage $72(2)$.

These operations will be repeated for successive stages $72(3)$ through the stage $72(N-1)$, as the address is transferred through successive address registers $71(3)$ through $71(N-1)$. After the address field ADRS__FIELD__N-1 of an Internet address is process in stage $72(N-1)$, that stage $72(N-1)$ also will provide either routing information or a pointer to stage $72(N)$. Stage $72(N)$ also includes a stage (N) processor $80(N)$. If the stage (N) processor $80(N)$ receives routing information (including default routing information or a notification that the meta-data generator 32 does not have routing information for the address) from stage $72(N-1)$, it will provide that routing information as the output routing information for the meta-data generator 32. On the other hand, if the stage $72(N)$ receives a pointer from the stage $72(N-1)$, pointing to an entry $73(N)(Y_N)$ in its table $73(N)$, the stage (N) processor $80(N)$ will provide the contents of the entry as the routing information for the Internet address.

FIG. 8 depicts a functional block diagram of the alternate embodiment, comprising a binary search tree arrangement, for generating the routing information for Internet addresses coupled thereto by the input port module control circuit 33 (FIG. 2). A functional block diagram of the binary search tree arrangement, identified by reference numeral 90, is depicted in FIG. 8. Preliminarily, the binary search tree arrangement actually defines a plurality of binary search trees. Each binary search tree has nodes organized in a plurality of levels from a single "root" node in the highest level to a plurality of leaves in the lowest level. Each node in a binary search tree between the root node and the leaf nodes has one parent in a higher level and two children in a lower level; the root node also has two children (but no parent), and each leaf has one parent (but no children). For each node, one of the children will be termed herein a "right-hand" child and the other of the children will be termed a "left-hand" child. It will be appreciated that, for each binary tree, the number of levels "NUM_LEVELS" is a function of the logarithm, to the base two, of the number of leaves "NUM_LEAVES"; specifically, NUM_LEVELS=$\log_2$ (NUM_LEVELS)+1.

Generally, a binary search tree is used to attempt to associate an input value with one of the leaves, in a plurality of iterations corresponding to the number of non-leaf-node levels, as follows. Each of the nodes in the binary tree above the leaf level, is associated with a comparison value, and the leaf nodes in the leaf are associated with the various values that are to be associated with the input values. In a first iteration, the input value is compared to the comparison value associated with the root node and, (i) if the input value is greater that or equal to the comparison value, the right-hand child will be selected, but, (ii) if the input value is less than the comparison value, the left-hand child will be selected.

Thereafter, if the nodes in the second level are not leaf nodes, in a second iteration, comparison will be performed in connection with the comparison value associated with the selected node in the second level, and one of its children will be selected in the same manner as for the root node (reference items (i) and (ii) above). These operations will be repeated respective iterations through the nodes in the respective levels above the leaf level. When the operation is performed in connection with a node at a level immediately above the leaf level, in the same manner as described above (reference items (i) and (ii) above), a child node in the leaf level is selected which, in turn, is associated with the value that is to be associated with the input value.

From this description of the operations performed in connection with a binary search tree, it will be appreciated that the comparison values associated with the nodes in each level, above the leaf level, essentially serve to divide the range of possible input values into a plurality of intervals. Thus, if the range of possible input values is [0, Max], where "Max" represents the maximum possible input value and "[x, y]" indicates that the range includes the endpoints "x" and "y," the root node divides the entire range into two intervals, [0,A], and [A, Max], where "A" is the comparison value associated with the root node, and "[x,y)" indicates an interval that includes the lower endpoint "x," but does not include the upper endpoint "y". Thus, if the input value falls in the lower interval [0,A), the left child node will be selected, but if the input value falls in the upper interval [A,Max], right child node will be selected. The left child of the root node further divides the interval [0,A], into two intervals [0,B) and [B,A], and the right child of the root node further divides the interval [A,Max] into two intervals [A,C) and [C,Max]. Generally, the nodes of the lower level, above the leaf level, serve to further divide the set of intervals defined by the next higher level into successively smaller intervals. Thus, it will be appreciated that the binary search tree essentially serves to associate the input value with an interval, with each interval being associated with a leaf node.

In the context of the invention, the input value is:an Internet address and the values associated with the leaf nodes comprise routing information.

With this background, the binary search tree arrangement 90 will be described in connection with FIG. 8. With reference to FIG. 8, the binary search tree arrangement includes an input register 91, an input table 92, a series of tree stages 95(1) through 95(N) (generally identified by reference numeral 95(n)) and a routing information table 112. Generally, the tree stages 95(1) through 95(N) store node information for nodes of the binary search trees comprising the binary search tree arrangement 90 above the leaf level, and the routing information table stores the routing information for the leaf nodes for the binary search trees comprising the binary search tree arrangement. As noted above, the binary search tree arrangement 90 defines a plurality of binary search trees, but the binary search trees can have different numbers of levels, and so the number "N" of stages 95(n) is a function of the maximum number of levels, above the leaf level, for all of the binary search trees. However, since all of the leaf nodes are essentially associated with the routing information table 112, the root nodes for the various binary search trees can be associate with various ones of the stages 95(n). That is, if a binary search tree has relatively few levels, its root node will be associated with a stage 95(n) for which index "n" is relatively close to "1," the index associated with the last stage 95(1). On the other hand, if a binary search tree has relatively many levels, its root node will be associated with a stage 95(n) for which index. "n" is relatively close to "N", the index associated with the first stage 95(N). The particular binary search tree with which an Internet address will be associated is determined by the high-order portion of the Internet address. The input table 92 contains, for each binary-encoded value of the high-order portion of the Internet address, a pointer that identifies the stage 95(n) that is associated with the root node for the binary search tree to be used for that binary-encoded value.

More specifically, the input table 92 includes a plurality of entries 92(1) through 92(N) (generally identified by reference numeral 92(n)), each of which is associated with one binary encoded value of the high-order portion of the Internet address. Each entry 92(n) comprises two fields, namely, a table delay field 93 and a next table index field 94. The table delay field 93 contains a value that is used in identifying the stage 95(n) that is associated with the root node for the tree, and the next table.index field 94 contains a pointer to an entry in a table (as described below) maintained by that stage 95(n) which contains a comparison value that is to be used in the comparison with a low-order portion of the Internet address.

Stages 95(N) through 95(1) are all similar, and only stage 95(N) is shown in detail in FIG. 8. As shown in FIG. 8, stage 95(N) includes a low-order address store 97, a table 96(N), and processing components as described below. The low-order address store 97, after the entry 92(n) in input table 92 has been accessed, receives and stores the low-order portion of the Internet address from the address register 91. Contemporaneously, the contents of the table delay field 93 and next table index 94 from the entry 92(*n*) of input table 92 that is associated with the high-order portion of the Internet address in address register 91 will be stored in a store 100. The table 96(N) includes a plurality of entries 96(N)(0) through 96(N)(Y$_N$) (generally identified by reference numeral 96(N)(y$_N$)), each of which is associated with a node in a binary comparison tree and includes an comparison value field 101. The comparison value field 101 in each of the entries 96(N)(y$_N$) corresponds to the node information for the root nodes of the largest binary comparison trees, that is, the binary comparison trees which have "N" levels above the leaf level. The comparison value field 101 stores a comparison value that will be compared to the low-order portion of the Internet address in store 97.

It will be appreciated that each of stages 95(N−1), . . . ,95(1) (generally identified by reference numeral 95(*n*)) also will have a table 96(N−1), . . . 96(1) (generally identified by reference numeral 96(*n*)), each of which will have a number Y$_{N-1}$, . . . Y$_1$ (generally, Y$_n$) of entries, each of which also stores comparison values. At least some of the entries in each table 96(N−1), . . . , 96(1) will correspond to child nodes of respective binary comparison trees of the entries in the table 96(N), . . . , 96(2) in the respective preceding stage, and so each table 96(N−1), . . . , 96(1) will have two times the number of entries in the preceding table 96(N), . . . , 96(2) to accommodate the child nodes. In addition, for a stage 95(N−1), . . . , 95(1) for which a binary comparison tree begins with that stage, the table 96(N−1), . . . , 96(1) associated with the stage will also have an additional number of entries each associated with the root of each binary comparison tree which begins with that stage, and in those cases the table 96(N−1), . . . , 96(1) can have more that two times the number of entries in the table 96(N), . . . , 96(2) associated with the preceding stage.

The processing components of the stage 95(N) perform a number of operations including:

(i) selecting an entry 96(N)(y) in the table 96(N) that is pointed to by the table index "TBL_IDX" portion of the store 100, which, in turn, corresponds to the contents of the next table index field 94 from the selected entry 92(*n*) of the input table, (ii) comparing the binary-encoded value of the low-order portion of the Internet address, in store 97, to the comparison value from field 101 of the selected entry 96(N)(y$_1$), (iii) generating a pointer to an entry in the table of the next stage 76(N−1) based on the results of the comparison in item (ii) above, and (iv) selecting either the pointer generated in item (iii) above or the table index from store 100 to couple to the next stage 95(N−1), based on a comparison between the value of the table delay value from store 100 and the stage's index "N".

If the table delay value in store 100 corresponds to the index "N" of the stage 95(N), then the entry pointed to by the table index in store 100 points to an entry 96(N)(y$_N$) in stage 95(N) that is the root node for the binary search tree to be used for the Internet address whose low-order portion is in store 97. Similarly, if the table delay value in store 100 is less than the index "N" of the stage 95(N), then the entry pointed to by the table index in store 100 points to an entry 96(N)(y$_N$) in stage 95(N) that is in the binary search tree to be used for the Internet address whose low-order portion is in store 97, but below the root node. In either case, the processing components will couple one of the generated pointers, based on the results of the comparison of the binary-encoded value of the low-order portion of the Internet address, in store 97, to the comparison value from field 101 of the selected entry 96(N)(y$_N$), to the store 100 of the next stage 95(N−1) for use as the table index, along with the table delay value from store 100 in stage 95(N).

On the other hand, if the table delay value in store 100 is greater than the index for the stage, then the entry pointed to by the table index in store 100 does not point to an entry in the stage's table that is a node in the binary search tree that is to be used for the Internet address whose low-order portion is in the store 97. In that case, the processing components will couple the index value from store 100 to the next stage 95(N−1) for use as the table index, along with the table delay value in store 100.

The processing components in stage 95(N) include a number of elements, including comparators 98 and 99, multiplexers 104 and 105, a multiplier 106 and an adder 107. The multiplier 106 and adder 107 serve to generate pointers to entries in the next stage 95(N−1). As described above, in a binary comparison tree, each node has two children. Thus, in one embodiment, the pointers to entries in the next stage are generated so that the children for entry 96(N)(0) will be in entries 96(N−1)(0) and 96(N−1)(1) in the table for stage 95(N−1), the children for entry 96(N)(1) will be in entries 96(N−1)(2) and 96(N−1)(3), and so forth. Thus, in that embodiment, the multiplier 106 and adder 107 can generate the pointers by multiplying the table index value in store 100 by the value "two" (which will be performed by the multiplier 106) to generate the pointer for one of the children of the node of the binary tree which is associated with the entry 96(N)(y$_N$), and adding the value "one" to the value generated by the multiplier 106 to generate the pointer for the other child. In that case, the entries 96(N−1)(0) through 96(N−1) (2Y$_N$−1) in the table 96(N−1) of the next stage 95(N−1) will be associated with child nodes in the binary comparison trees whose root nodes are associated with entries 96(N)(y$_N$) in the table 96(N) associated with stage 95(N). If any binary comparison trees have root nodes associated with stage 95(N−1), those root nodes will be associated with respective additional entries 96(N−1) (2Y$_N$), . . . in the table 96(N−1). Tables 96(N−2), . . . , 96(1) are similarly organized.

The comparator 98 serves to compare the low-order portion of the Internet address from store 97 and the comparison value from field 101 of the selected entry 96(N)(Y) and controls the multiplexer 104 in response thereto. If the comparator 98 determines that the low-order portion of the Internet address from store 97 is greater than or equal to the comparison value from field 101 of the selected entry 96(N)(Y), the multiplexer 104 will couple the pointer generated by adder 107 to one input of multiplexer 105. On the other hand, if the comparator 98 determines that the low-order portion of the Internet address from store 97 is less than the comparison value from field 101 of the selected entry 96(N)(Y), the multiplexer 104 will couple the pointer generated by the multiplier 106 to the same input of multiplexer 105. The table index from store 100 is coupled to the second input of multiplexer 105.

The multiplexer 105, in turn, is controlled by a signal from the comparator 99. The comparator 99 receives the table delay value from store 100, and also a value corresponding to the stage index "N". If the table delay value is less than or equal to the stage index, the multiplier 105 will couple the value provided by multiplexer 104, that is, the pointer generated by the multiplier 106 or the adder 107 to the next stage 95(N−1). On the other hand, if the table delay in store 100 has a value that is greater than the stage index, the multiplexer 105 will couple the table index from store 100 to the next stage 95(N−1).

It will be appreciated that the functions described as being provided by multiplier 106, adder 107 and multiplexer 104 can be implemented without provided explicit components therefor. Since multiplication of the table index by "two" corresponds to shifting the binary digits comprising the table index in store 100 to the "left" by one bit position, and adding "one" corresponds to setting the binary digit in the low-order bit position, the functions can be provided by coupling bits $TI_H \ldots TI_0$ (not seperately shown) comprising the table index in store 100, onto signal paths $S_{H+1} \ldots S_1$ (also not separately shown) of the associated input terminal of multiplex 105 (that is, the input terminal shown as receiving a signal from multiplexer 104). A low-order signal path $S_0$ receives the signal from the comparator 98, thus, the result of the comparison between the comparison value in the selected entry of table 96(N) with the low-order portion of the address in store 97 controls which of the entries $96(N-1)(y_{N-1})$ in the table 96(N−1) associated with the next stage 95(N−1) that is selected.

It will be appreciated that the entries $96(N)(y_N), \ldots, 96(2)(y_2)$ in the tables 96(N), ..., 96(2) of respective stages 95(N), ..., 95(2) can include explicit pointers to entries $96(N-1)(y_{N-1}), \ldots, 96(1)(y_1)$ of the respective next stages 95(N−1), ..., 95(1), if the association between entries and nodes of the respective binary comparison trees is not constrained as described above.

The invention provides a number of advantages. In particular, it provides a switching node that provides the scalability of a input-queued switching node, while maintaining substantially the efficiency of switching fabric usage of an output-queued switching node. Since the packets are buffered at the input port modules 20(n) until the determination has been made (by the packet meta-data processor 23) that they are to be transmitted by respective output port modules 21(n), and further until they are requested by the respective output port modules 21(n) for to be transferred thereto for transmission, only "N" buffers, or queue, is needed, one for each input port module 20(n), whereas in an output-queued switching node $N^2$ buffers would be required. On the other hand, since the determination as to whether to pass or drop a packet is made for each output port module 21(n) in connection with meta-data packets queued therefor from all of the input port modules 20(n), the pass/drop determination is made for all input port modules 20(n) in a manner that is essentially the same as in an output-queued switching node. However, since the pass/drop determination is made on a meta-data packet that is generally much smaller than the size of a typical packet transferred through the network, by providing that packets that are dropped do not pass through the packet switch 22, as would occur in output-queued switching nodes, switching bandwidth that would otherwise be taken up by transferring packets that are later dropped by the output port modules 21(n) can be reduced.

In addition, since the pass/drop decision for a packet is made before the packet is transferred from the respective input port module 20(n) to the respective output port module 21(n), bandwidth between the input and output port modules 21(n) through the inter-port packet switch 22 will not be taken up by packets which will likely-be dropped by the output port module 21(n) if the output port module 21(n) is congested. This serves to optimize packet traffic between the input and the output port modules by ensuring that only packets that are likely to be transmitted when they reach the output port modules will be transferred by the input port modules thereto. This provides the switching node 11(n) with the ability to handle a relatively high traffic capacity, since resources are not wasted in transferring packets through the switching node 11(n) which will be dropped when they reach the respective output port module 21(n) which would otherwise transmit them, but is unable to due to congestion.

More generally, since the pass/drop decision is made by the packet meta-data processor for each output port module 21(n) based on the "global" information which provided to it by all of the input port modules 20(n), the switching node 11(n) is able to operate as a single monolithic entity rather that as a collection of smaller entities. This global information provides the respective output port module 21(n) with a global view representing the states of all of the input port modules 20(n). In devices which do not provide this view, decisions can be made on information provided by groups of input port modules 20(n), which group information is aggregated into a common view which is used by the respective output port module 21(n). Depending on how the input port modules 20(n) are grouped and how the information provided by each group is aggregated, important information concerning the states of the respective input port modules 20(n) in each group can be ignored, which, in turn, can cause the output port module 21(n) to operate as though the switching node were a collection of smaller entities based on the association of the input port modules 20(n) with the respective groups. This, in turn, can the reduce the traffic handling capacity of the switching node as a whole.

It will be appreciated that numerous modifications may be made to the switching node 11(n) described above in connection with FIGS. 2 through 6. For example, although the switching node 11(n) has been described as making use of the IP routing protocol for transferring messages, it will be appreciated that a number of convenient routing protocols, making use of variable-or fixed-length packets, may be used, including, but not limited to, IP packets, ATM cells, frame relay packets and the like.

In addition, although the meta-data processors 40(n) have been described as providing a separate status information store 43(n) associated with the respective output port module 21(n), it will be appreciated that the meta-data processor 23 may instead have a cache memory (not shown) which stores the identifications of the output port modules 21(n) which are congested, which can be used by the packet pass/drop circuits 42(n) of all of the meta-data processors 40(n). If, as would be expected, only a small number of output port modules 21(n) would be congested at any point in time, the amount of memory required by using the cache memory may be less than would by required if a store 43(n) were provided for each meta-data processor 40(n).

Furthermore, although the switching node 11(n) has been described as making use of a cross-point switch as the inter-port packet switch, it will be appreciated that any of a number of other forms of switches can be used.

In addition, although the packet meta-data processor 23 has been described as providing one processor module 40(n) associated with each output port module 21(n), it will be appreciated that it may instead provide a processor module associated with each output port 26(n)(m). In that case, the respective output port module 21(n) would provide to the processor module operational status information associated with the respective output port 26(n)(m), which the processor module would use in making the pass/drop determination. In addition, each output port module 21(n) can schedule retrievals of meta-data packets which have been passed by the respective processor modules associated with its output ports 26(n)(m), and subsequent retrievals of packets associated therewith, so as to be able to maximize packet transmission through all of the output ports 26(n)(m).

In addition, although the meta-data generator 32 has been described as making use of a single comparison tree in identifying the appropriate route for a destination address, it will be appreciated that the meta-data- generator 32 can be structured to use a number of such comparison trees, with the selection of the particular comparison tree to be used to be determined by, for example, the binary-encoded value represented by selected ones of the high order bits of the destination address. In that case, the comparison tables would be structured based on the remaining low-order bits, and the comparisons would be made in connection with the low-order bits of the destination address.

In addition, although the switching node 11(n) has been described as making use of SONET add/drop multiplexers as input ports 25(n)(m) and output ports 26(n)(m), it will be appreciated that other types of devices for interfacing to communication links may conveniently be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method of controlling the transfer of data from an input module to an output module on a network, said method comprising:
   providing a control module for controlling communication between the input module and the output module;
   receiving a packet of data at the input module, the input module generating a meta-data packet in response to the packet of data, the meta-data packet including information identifying the output module to which the packet of data is to be transferred, the input module transferring the meta-data packet to the control module; and
   at the control module,(i) receiving the meta-data packet from the input module, (ii) receiving from the identified output module a first item of information which indicates whether or not the packet of data will be dropped if sent, and (iii) based on the first item of information, if the packet of data is to be dropped, notifying the input module to drop the packet of data.

2. The method of claim 1 further comprising coupling the input port module to the output port module through a switching module such that packets of data are transferred from the input port module to the output port module over the switching module.

3. The method of claim 1 wherein the first item of information indicates congestion of data at the identified output port module.

4. The method of claim 1 wherein the first item of information indicates availability of the identified output port module to receive packets of data.

5. The method of claim 1 further comprising storing the packet of data in at least one buffer associated with the input port module.

6. The method of claim 5 further comprising, in response to "transferring a second item of information from the control module to the input module, said second item of information indicating that the packet of data will not be transferred to the identified output module"; transferring from the control module to the input port module a command for the input port module to clear the at least one buffer that stores the packet of data without transferring the packet of data to the identified output port module.

7. The method of claim 5 further comprising, in response to "transferring a second item of information from the control module to the input module, said second item of information indicating that the packet of data will not be transferred to the identified output module"; transferring from the control module to the input port module a command for the input port module to reallocate the at least one buffer that stores the packet of data without transferring the packet of data to the identified output port module.

8. An apparatus for transferring data on a network, said apparatus comprising:
   an input module for receiving packets of data from the network;
   an output module for receiving packets of data from the input module and transferring packets of data onto the network; and
   a control module for controlling communication between the input module and the output module; wherein:
   the input module is adapted to (i) generate the meta-data packet in response to a received packet of data, the meta-data packet including information identifying the output module to which the packet of data is to be transferred, and (ii) transfer the meta-data packet to the control module; and
   the control module is adapted to (i) receive the meta-data packet from the input module, (ii) receive from the identified output module a first item of information which indicates whether or not the packet of data will be dropped if sent, and (iii) based on the first item of information, if the packet of data is to be dropped, notifying the input module to drop the packet of data.

9. The apparatus of claim 8 further comprising a switching module over which packets of data are transferred from the input port module to the output port module.

10. The apparatus of claim 8 wherein the first item of information indicates congestion of data at the identified output port module.

11. The apparatus of claim 8 wherein the first item of information indicates availability of the identified output port module to receive packets of data.

12. The apparatus of claim 8 wherein the input port module is associated with at least one buffer for storing the received packet of data.

13. The apparatus of claim 12 wherein the control module transfers to the input port module, in response to "transferring a second item of information from the control module to the input module, said second item of information indicating that the packet of data will not be transferred to the identified output module"; a command for the input port module to clear the at least one buffer that stores the received packet of data without transferring the packet of data to the identified output port module.

14. The apparatus of claim 12 wherein the control module transfers from the control module to the input port module, in response to "transferring a second item of information from the control module to the input module, said second item of information indicating that the packet of data will not be transferred to the identified output module"; a command for the input port module to reallocate the at least one buffer that stores the received packet of data without transferring the packet of data to the identified output port module.

* * * * *

UNITED STATES PATENT AND TRADEMARK OFFICE
CERTIFICATE OF CORRECTION

PATENT NO. : 6,529,478 B1
DATED : March 4, 2003
INVENTOR(S) : Steven J. Schwartz et al.

It is certified that error appears in the above-identified patent and that said Letters Patent is hereby corrected as shown below:

<u>Title page,</u>
Item [73], Assignee, reads "Fluris, Inc., Cupertino, CA (US)" should read -- Pluris, Inc., Cupertino, CA (US) --

Signed and Sealed this

Twelfth Day of October, 2004

JON W. DUDAS
*Director of the United States Patent and Trademark Office*